(12) United States Patent
Fradella

(10) Patent No.: US 7,646,178 B1
(45) Date of Patent: Jan. 12, 2010

(54) BROAD-SPEED-RANGE GENERATOR

(76) Inventor: Richard B. Fradella, 33872 Calle Conejo, San Juan Capistrano, CA (US) 92675

( * ) Notice: Subject to any disclaimer, the term of this patent is extended or adjusted under 35 U.S.C. 154(b) by 0 days.

(21) Appl. No.: 12/463,295

(22) Filed: May 8, 2009

(51) Int. Cl.
*H02P 9/14* (2006.01)

(52) U.S. Cl. ............... 322/46; 322/22; 322/29; 322/28; 322/37; 322/45; 322/62

(58) Field of Classification Search ............ 322/22, 322/28, 37, 29, 45, 46, 62
See application file for complete search history.

(56) References Cited

U.S. PATENT DOCUMENTS

| | | | |
|---|---|---|---|
| 295,534 | A | 3/1884 | Frick |
| 459,610 | A | 9/1891 | Desroziers |
| 1,566,693 | A | 12/1925 | Pletscher |
| 2,743,375 | A | 4/1956 | Parker |
| 2,864,964 | A | 12/1958 | Kober |
| 3,050,650 | A | 8/1962 | Henry-Baudot |
| 3,069,577 | A | 12/1962 | Royal |
| 3,090,880 | A | 5/1963 | Raymond |
| 3,091,711 | A | 5/1963 | Henry-Baudot |
| 3,124,396 | A | 3/1964 | Barager |
| 3,219,861 | A | 11/1965 | Burr |
| 3,230,406 | A | 1/1966 | Henry-Baudot |
| 3,231,807 | A | 1/1966 | Willis |
| 3,239,702 | A | 3/1966 | Van De Graaff |
| 3,304,598 | A | 2/1967 | Henry-Baudot |
| 3,337,122 | A | 8/1967 | Gross |
| 3,375,386 | A | 3/1968 | Hayner et al. |
| 3,401,284 | A | 9/1968 | French |
| 3,407,320 | A | 10/1968 | McLean |
| 3,441,761 | A | 4/1969 | Painton et al. |
| 3,569,753 | A | 3/1971 | Babikyan |
| 3,584,276 | A | 6/1971 | Ringland et al. |
| 3,696,277 | A | 10/1972 | Liska et al. |
| 3,731,984 | A | 5/1973 | Habermann |
| 3,796,039 | A | 3/1974 | Lucien |
| 3,845,339 | A | 10/1974 | Heinzmann et al. |

(Continued)

OTHER PUBLICATIONS

Fitzgerald & Kingsley, "Electric Machinery, an Integrated Treatment of AC and DC Machines", 1952, p. 131, McGraw-Hill Book Co., USA.

(Continued)

*Primary Examiner*—T C Patel
*Assistant Examiner*—Iraj A Mohandesi

(57) ABSTRACT

A brushless generator with permanent-magnet multi-pole rotor disks and coreless stator winding disks includes integral electronics to efficiently generate regulated DC current and voltage from shaft input power over a broad speed range. Its power rating is scalable, and it incurs no cogging torque, or friction from gearing. Integral power control electronics includes high-frequency pulse-width-modulated boost regulation, which provides regulated current at requisite voltage over its broad speed range. A main embodiment to produce DC power at widely variable speeds includes signal processing so output power varies according to the third power of speed. A version for use with vertical-axis wind turbines has a relatively large diameter to facilitate a large number of poles. Combined boost-regulation, zero cogging torque, and no gearing, enable a wide speed range, for better power quality and higher wind energy yields. An alternate embodiment is intended to produce DC power from a variety of shaft drive sources, with selectable shaft torque.

18 Claims, 16 Drawing Sheets

U.S. PATENT DOCUMENTS

| | | | |
|---|---|---|---|
| 3,899,731 A | 8/1975 | Smith | |
| 3,982,170 A | 9/1976 | Gritter et al. | |
| 4,085,355 A | 4/1978 | Fradella | |
| 4,127,799 A | 11/1978 | Nakamura et al. | |
| 4,207,510 A | 6/1980 | Woodbury | |
| 4,228,391 A | 10/1980 | Owen | |
| 4,295,083 A | 10/1981 | Leenhouts | |
| 4,358,723 A | 11/1982 | Scholl et al. | |
| 4,371,801 A | 2/1983 | Richter | |
| 4,384,321 A | 5/1983 | Rippel | |
| 4,390,865 A | 6/1983 | Lauro | |
| 4,394,597 A | 7/1983 | Mas | |
| 4,417,194 A | 11/1983 | Curtiss et al. | |
| 4,426,613 A | 1/1984 | Mizuno et al. | |
| 4,520,300 A | 5/1985 | Fradella | |
| 4,618,806 A | 10/1986 | Grouse | |
| 4,645,961 A | 2/1987 | Malsky | |
| 4,656,413 A | 4/1987 | Bourbeau | |
| 4,694,187 A | 9/1987 | Baker | |
| 5,021,698 A | 6/1991 | Pullen et al. | |
| 5,099,186 A | 3/1992 | Rippel et al. | |
| 5,117,141 A | 5/1992 | Hawsey et al. | |
| 5,204,569 A | 4/1993 | Hino et al. | |
| 5,245,238 A | 9/1993 | Lynch et al. | |
| 5,258,697 A | 11/1993 | Ford et al. | |
| 5,289,361 A | 2/1994 | Vinciarelli | |
| 5,341,075 A | 8/1994 | Cocconi | |
| 5,355,070 A | 10/1994 | Cocconi | |
| 5,392,176 A | 2/1995 | Anderson | |
| 5,419,212 A | 5/1995 | Smith | |
| 5,441,222 A | 8/1995 | Rosen et al. | |
| 5,495,221 A | 2/1996 | Post | |
| 5,514,923 A | 5/1996 | Gossler et al. | |
| 5,525,894 A | 6/1996 | Heller | |
| 5,614,777 A | 3/1997 | Bitterly et al. | |
| 5,681,012 A | 10/1997 | Rosmann et al. | |
| 5,705,902 A | 1/1998 | Merritt et al. | |
| 5,712,549 A | 1/1998 | Engel | |
| 5,717,303 A | 2/1998 | Engel | |
| 5,729,118 A | 3/1998 | Yanagisawa et al. | |
| 5,754,425 A | 5/1998 | Murakami | |
| 5,783,885 A | 7/1998 | Post | |
| 5,798,591 A | 8/1998 | Lillington et al. | |
| 5,847,480 A | 12/1998 | Post | |
| 5,861,690 A | 1/1999 | Post | |
| 5,880,544 A | 3/1999 | Ikeda et al. | |
| 5,883,499 A | 3/1999 | Post | |
| 5,969,446 A | 10/1999 | Eisenhauere et al. | |
| 5,977,677 A | 11/1999 | Henry et al. | |
| 5,977,684 A | 11/1999 | Lin | |
| 5,982,074 A | 11/1999 | Smith et al. | |
| 6,011,337 A | 1/2000 | Lin et al. | |
| 6,049,149 A | 4/2000 | Lin et al. | |
| 6,121,704 A | 9/2000 | Fukuyama et al. | |
| 6,130,831 A | 10/2000 | Matsunaga | |
| 6,137,187 A | 10/2000 | Mikhail et al. | |
| 6,147,474 A * | 11/2000 | Koss et al. | 322/59 |
| 6,166,472 A | 12/2000 | Pinkerton et al. | |
| 6,217,398 B1 | 4/2001 | Davis | |
| 6,246,146 B1 | 6/2001 | Schiller | |
| 6,259,233 B1 | 7/2001 | Caamano | |
| 6,262,505 B1 | 7/2001 | Hockney et al. | |
| 6,288,670 B1 | 9/2001 | Villani et al. | |
| 6,388,347 B1 | 5/2002 | Blake et al. | |
| 6,407,466 B2 | 6/2002 | Caamano | |
| 6,566,775 B1 | 5/2003 | Fradella | |
| 6,630,761 B1 | 10/2003 | Gabrys | |
| 6,710,489 B1 | 3/2004 | Gabrys | |
| 6,750,588 B1 | 6/2004 | Gabrys | |
| 6,794,777 B1 | 9/2004 | Fradella | |
| 6,815,934 B2 | 11/2004 | Colley | |
| 6,858,962 B2 | 2/2005 | Post | |
| 6,879,053 B1 | 4/2005 | Welches et al. | |
| 6,897,587 B1 | 5/2005 | McMullen et al. | |
| 6,965,818 B2 * | 11/2005 | Koenig et al. | 701/36 |
| 6,969,922 B2 | 11/2005 | Welches et al. | |
| 7,021,978 B2 | 4/2006 | Jansen | |
| 7,157,885 B2 * | 1/2007 | Nakagawa et al. | 322/28 |
| 7,190,101 B2 | 3/2007 | Hirzel | |
| 7,541,784 B2 * | 6/2009 | Davis | 322/22 |
| 2006/0208606 A1 | 9/2006 | Hirzel | |

OTHER PUBLICATIONS

Richard B. Fradella, "Effects of Phase and Distortion on Servomotor Performance", Thesis, 1960, California Institute of Technology, USA.

* cited by examiner

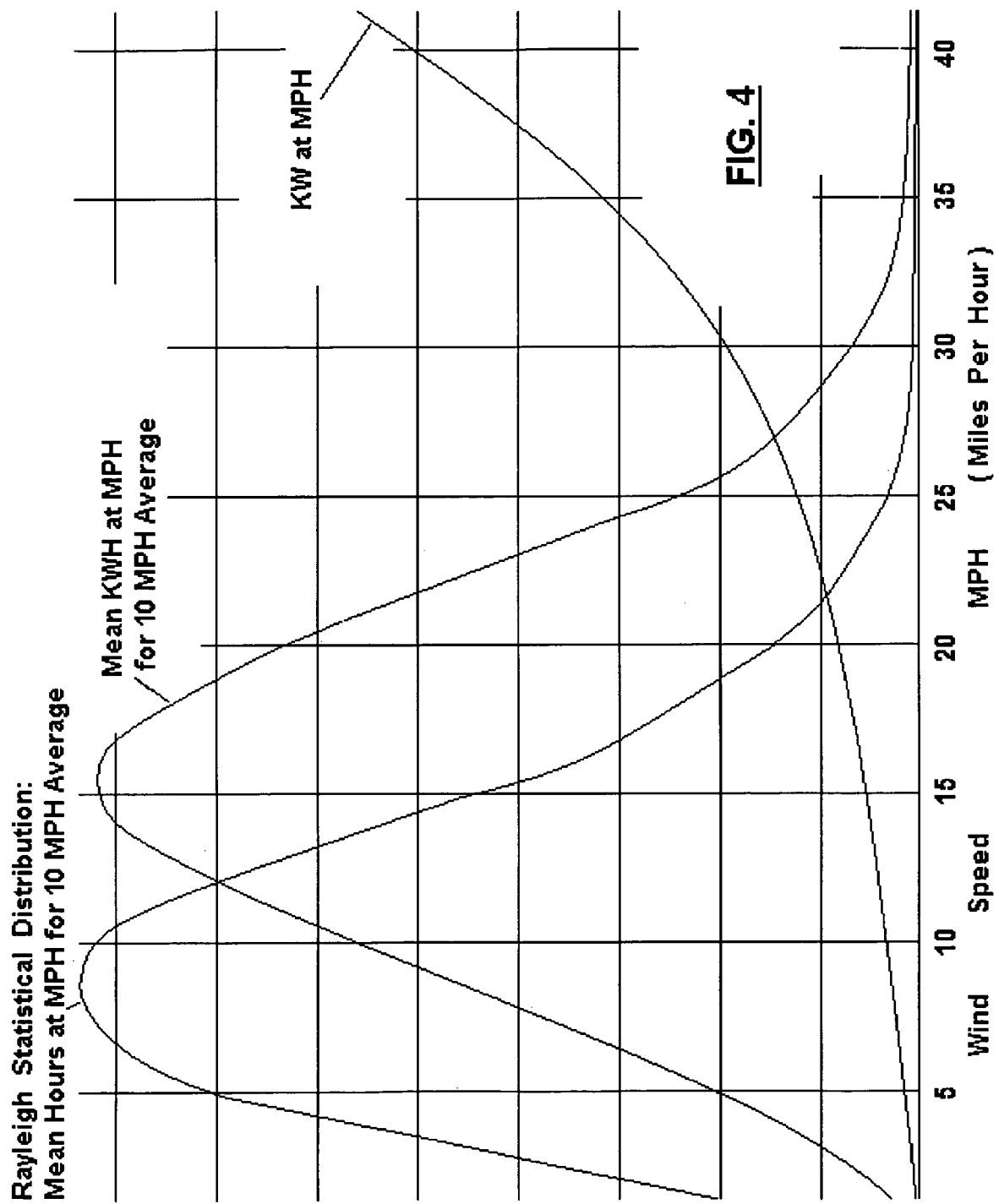

BROAD-SPEED-RANGE GENERATOR

CROSS REFERENCE TO RELATED APPLICATIONS

The contents of the co-pending application filed simultaneous herewith having docket number ExcEn_RPM_FW entitled "Low-Cost Minimal-Loss Flywheel Battery" and invented by the present inventor is incorporated herein by reference in entirety.

BACKGROUND OF THE INVENTION

1. Field of the Invention

This invention pertains generally to rotary dynamoelectric machines, and more particularly to dynamoelectric machines having novel rotor and stator structures, to generators having permanent-magnet axial-field rotor and stator disks, and further to cooperative integrated electronics for wide range power control and efficient electric power interface with loads.

Applicant sets forth a brushless self-synchronous generator with permanent-magnet rotor disks and stator winding disks, including integral electronics, to efficiently generate DC (direct-current) electric power, at current and voltage regulated by the electronics, from broadly variable speed rotary mechanical drive. Its various embodiments are intended to generate useful electric power efficiently, especially at low speed and torque, from a wide variety of variable speed and torque drive sources. Moreover, it is intended to substantially improve and expand sustainable environmentally responsible energy options, such as wind power, hydrodynamic power, and human-power-assisted electric vehicles. A main embodiment is intended to generate better quality electric power from wind turbines, and higher energy yields, compared to prior art wind turbine generators.

2. Description of the Related Art

Poly-phase (usually 3-phase) alternating-current (AC) salient-pole induction machines, having wound stators and rotors, are presently directly connected to power grids in "wind farms" to augment grid power from windy locations. They do not incur major grid synchronization problems, as do directly connected synchronous generators, which are mostly used in generating plants where their shaft speed is regulated and output carefully synchronized prior to parallel connection with on-line generators. However, induction machines generate power only when shaft speed exceeds that needed at zero slip speed. They cannot self-start from turbine drive, and consume grid power (not augment it) whenever their speed falls below a critical zero slip speed level. Moreover, their power is unregulated, and they must be disconnected from the grid at very high wind speeds, because their power fluctuations and internal generator heating are excessive. For a comprehensive analysis and Thevenin equivalent circuits of induction machines, see, for example, the textbook "Electric Machinery" (an integrated treatment of AC and DC machines) McGraw-Hill Book Co. 1952, by Fitzgerald & Kingsley, Massachusetts Institute of Technology, Chapter 3 (especially page 131 and Chapter 9). For further analysis and performance prediction of broader speed range but less efficient 2-phase induction machines, see "Effects of Phase-Shift and Distortion on Servomotor Performance," 1960, by Richard B. Fradella, MSEE research and thesis, California Institute of Technology.

Peripheral equipment needed for augmenting grid power from wind turbines, which drive induction generators, may include gears to increase generator shaft speed, switchgear to connect and disconnect said generators from the grid as wind speed varies, gear lubricant, pumps and heat exchangers to cool the lubricant, a generator cooling system, and external heat-dumps.

Over the past two decades, power electronics has been developed to provide a power control interface between induction machines and DC voltage supplies such as chemical batteries. This electronics converts the DC voltage to substantially variable-frequency poly-phase voltage (albeit with high distortion) at the induction machine poly-phase terminals, enabling these machines to perform as bi-directional motors or generators. For example, an induction machine with applied fundamental frequency component appropriately higher than its electrical frequency at a given shaft speed can be driven as a variable-speed induction motor, from zero to a desired speed. With its shaft driven by rotary power, the same induction machine with applied poly-phase voltage having a frequency appropriately lower than its electrical frequency at a given shaft speed can instead generate power as a variable-speed induction generator. By reversing the poly-phase sequence, the induction machine can likewise drive in the opposite direction, or can generate power from a shaft driven in the opposite direction. Silicon Controlled Rectifier (SCR) power switching semiconductors are useful as the DC to poly-phase power switching interface for induction machines, because they are rugged and can control considerably higher power than comparable cost high-frequency switching semiconductors. Moreover, the iron cores of said induction machines have high inductance, so it is not feasible to use a series low-loss ferrite core inductor as described for the present invention. Induction machine core loss would be very high, with attendant heating problems, if subjected to high-frequency switching pulse-duration-modulation (PWM) to provide poly-phase sinusoidal voltages having low harmonic distortion across the induction machine stator winding terminals.

Prior art inventions that provide examples of power interface electronics for variable-speed induction machines that are driven by chemical batteries and regenerate power thereto include: U.S. Pat. No. 5,099,186 by Rippel et al; and U.S. Pat. No. 5,355,070 by Cocconi.

Synchronous AC generators include salient-pole alternators having wound stators and permanent-magnet rotors. Their output voltage and frequency are substantially proportional to their shaft speed. Brushless salient-pole reluctance machines having wound stator poles with magnetic bias from permanent magnets, is one type. Those generators may include field windings, to afford limited voltage regulation. Homopolar machines are also a synchronous brushless type, with their power output frequency proportional to speed; they afford wider range voltage adjustment. If their field is derived only from a field winding, they will need electric startup power for that winding. Cogging torque (wherein the rotor angle aligns its iron cores with and holds minimum magnetic reluctance positions), like stiction and friction in gears, may cause wind turbines to stall at low wind speeds. These shortcomings and too low output voltage at low shaft speeds prevent usable power generation at low wind speeds from this prior art machine. Adding a boost regulator in series with the rectified and filtered alternator type generator output can facilitate higher voltages at low shaft speeds, needed for loads such as chemical batteries, but the boost regulator incurs tandem losses and machine cogging may stall the wind turbine driving it so no electric power output is produced from this prior art machine at low wind speeds.

By comparison, the present invention is intended to generate power at requisite voltage over its entire wide speed range, will not need electric startup power from its load or any other external source, and will efficiently generate power even from very low shaft torque rotation from low wind speeds, not stalled by cogging torque, stiction, or friction.

Besides their use for AC power generation in power plants, applications for synchronous generators range widely, usually with their AC outputs rectified, to charge batteries and the like. However, their varying voltage and frequency can be a major disadvantage. Generated and rectified voltage must be sufficient, and usually regulated, to meet needs of given applications. Moreover, very low frequency ripple at low shaft speed requires large filter capacitors, which cost more and have shorter lifetimes than ceramic or film capacitors. These properties usually limit synchronous generator applications to high shaft speeds. Their cogging torque is another drawback. Peripheral equipment needed for augmenting grid power, from alternators used as generators driven by wind turbines, usually include gears to increase generator shaft speed, rectifiers to convert their AC outputs to DC, and power inverters to convert the DC to regulated AC in phase with the grid. Moreover, their varying output voltage and current must be regulated, for chemical battery charging applications; which requires a battery charger.

Brush-commutated DC generators may have permanent-magnet field excitation. They may also have field excitation windings, for limited output voltage adjustment. Besides shorter lifetimes due to their commutator brush and armature wear, commutator sparking can be troublesome; and, similar to most prior art generators, their DC output voltage is proportional to speed, thus precluding many low shaft speed applications, unless their output is connected to loads via boost regulator circuits. Alternatively, their varying output voltage and current may require a buck regulator, between the generator output and its load. Such external and series electronics reduces overall power efficiency, particularly at low turbine shaft speeds.

Regardless of said drawbacks, these machines are widely used as generators for some applications. Peripheral equipment, for use as generators driven by wind turbines, may include speed-up gearing and output rectifiers. Said rectifiers may be needed, to prevent power from a DC power-bus load, which it feeds, such as chemical batteries it is meant to charge, from driving said DC generator as a motor, and discharging connected batteries whenever the generator output voltage is less than the battery voltage. Power regulator circuits, such as battery chargers, are usually needed. Besides these limitations, brush-commutated generators also need periodic commutator maintenance; as their commutators are damaged with use, by wear and sparking.

Gearing needed to increase prior art generator shaft speed, so prevalent in wind power systems, also needs bearings for the gears, is subject to wear, needs periodic maintenance, and incurs power losses. The gearing stiction further inhibits and usually prevents power generation at low wind speeds. Conversely, the present invention, having no cogging torque and no speed-up gearing, is intended to generate power over a very wide speed range.

Most electric motors can be used as generators. There is fundamentally no difference, between most prior art motors and generators, of a specific type, except for how they are used to meet needs of specific applications. For example, an induction machine can serve as an induction motor or as a generator. Motors used in ubiquitous machinery, tools, and appliances can be configured mechanically and electrically as generators.

Insofar as drive speed and torque is regulated at steam driven and large hydroelectric power plants, the prior art generators described above have provided acceptable options, to generate most of the electric power that is distributed by power grids, for over a century.

Smaller and portable versions of said generators, driven by fuel-burning engines, also serve viable small markets. However, need for wider speed range has been long recognized.

Some prior art inventions have intended to accommodate variable-speed drives, by means substantially different from my present invention:

U.S. Pat. No. 4,694,187 "Electromechanical Constant Speed Drive Generating System" by Baker, includes a mechanical differential gear, to obtain constant speed drive for a generator. It is mainly intended to accommodate variable-speed aircraft engine drive, by including controlled variable compensatory drive. It does not teach a generator assembly similar to the present invention, nor does it include electronics similar to the present invention.

U.S. Pat. No. 6,969,922 "Transformerless Load Adaptive Speed Controller" by Welches, includes electromechanical means, to obtain constant speed generator drive, from a variable-speed drive source. Its generator assembly is substantially different from the present invention, and it does not teach electronics similar to the present invention.

U.S. Pat. No. 5,982,074 "Axial Field Motor/Generator" by Smith et al and my U.S. Pat. No. 4,530,200 teach, with some differences, a motor/generator assembly having multi-pole axial magnetic field rotor disks and stator disks between them, but they do not set forth electronics similar to the present invention, intended to efficiently generate regulated electric power over a broad speed range.

U.S. Pat. No. 5,245,238 "Axial Gap Dual Permanent Magnet Generator" by Lynch et al, describes means for generating constant output voltage that do not include electronics similar to the present invention. Its generator assembly and rotor disks are also distinctly different from those herein described in all embodiments of the present invention.

U.S. Pat. No. 7,190,101 "Stator Coil Arrangement for an Axial Airgap Electric Device Including Low-Loss Materials" by Hirzel, teaches a substantially different generator assembly and materials, and does not set forth electronics similar to the present invention.

U.S. Pat. No. 5,021,698 "Axial Field Electrical Generator" by Pullen et al, describes a high-speed generator assembly substantially different from the present invention, and does not describe electronics.

U.S. Pat. No. 6,217,398 "Human-Powered Or Human-Assisted Energy Generation And Transmission System With Energy Storage Means And Improved Efficiency" by Davis; and U.S. Pat. No. 7,021,978 "Human-Powered Generator System With Active Inertia And Simulated Vehicle" by Jansen; describe means to use variable effort pedal power. They teach using electric generators with operator adjustable control means, and their advantages over mechanical drives, for augmenting vehicle power, in applications including electric vehicles, watercraft, and the like. However, they do not teach generator assembly configurations nor an electronics power interface as set forth in the present invention.

Other exemplary patents for rotary dynamoelectric machines and for other apparatus which may or may not be related but which provide illustration from which the teachings are incorporated herein by reference, include: U.S. Pat. No. 295,534 by Frick; U.S. Pat. No. 459,610 by Desroziers; U.S. Pat. No. 1,566,693 by Pletscher; U.S. Pat. No. 2,743,375 by Parker; U.S. Pat. No. 2,864,964 by William Kober; U.S. Pat. No. 3,050,650 by Jacques; U.S. Pat. No. 3,069,577 by Royal; U.S. Pat. No. 3,090,880 by Henri; U.S. Pat. No. 3,091,711 by Jacques; U.S. Pat. No. 3,124,396 by Barager; U.S. Pat.

No. 3,219,861 by Burr; U.S. Pat. No. 3,230,406 by Jacques; U.S. Pat. No. 3,231,807 by Willis; U.S. Pat. No. 3,239,702 by Van De Graaff; U.S. Pat. No. 3,304,598 by Jacques; U.S. Pat. No. 3,337,122 by Johann; U.S. Pat. No. 3,375,386 by Hayner et al; U.S. Pat. No. 3,401,284 by Park; U.S. Pat. No. 3,407,320 by Mclean; U.S. Pat. No. 3,441,761 by Painton et al; U.S. Pat. No. 3,569,753 by Babikyan; U.S. Pat. No. 3,584,276 by Ringland et al; U.S. Pat. No. 3,696,277 by Liska et al; U.S. Pat. No. 3,731,984 by Habermann; U.S. Pat. No. 3,796,039 by Lucien; U.S. Pat. No. 3,845,339 by Heinzmann et al; U.S. Pat. No. 3,899,731 by Smith; U.S. Pat. No. 3,982,170 by Gritter et al; U.S. Pat. No. 4,127,799 by Nakamura et al; U.S. Pat. No. 4,207,510 by Woodbury; U.S. Pat. No. 4,228,391 by Owen; U.S. Pat. No. 4,264,856 by Frierdich et al; U.S. Pat. No. 4,295,083 by Leenhouts; U.S. Pat. No. 4,358,723 by Scholl et al; U.S. Pat. No. 4,371,801 by Richter; U.S. Pat. No. 4,384,321 by Rippel; U.S. Pat. No. 4,390,865 by Lauro; U.S. Pat. No. 4,394,597 by Mas; U.S. Pat. No. 4,415,963 by Rippel et al; U.S. Pat. No. 4,417,194 by Curtiss et al; U.S. Pat. No. 4,426,613 by Mizuno et al; U.S. Pat. No. 4,483,570 by Inoue; U.S. Pat. No. 4,513,214 by Dieringer; U.S. Pat. No. 4,618,806 by Grouse; U.S. Pat. No. 4,645,961 by Malsky; U.S. Pat. No. 4,656,413 by Bourbeau; U.S. Pat. No. 4,694,187 by Baker; U.S. Pat. No. 4,734,839 by Barthold; U.S. Pat. No. 5,021,698 by Pullen et al; U.S. Pat. No. 5,117,141 by Hawsey et al; U.S. Pat. No. 5,204,569 by Hino et al; U.S. Pat. No. 5,258,697 by Ford et al; U.S. Pat. No. 5,289,361 by Vinciarelli; U.S. Pat. No. 5,341,075 by Cocconi; U.S. Pat. No. 5,392,176 by Anderson; U.S. Pat. No. 5,419,212 by Smith; U.S. Pat. No. 5,441,222 by Rosen; U.S. Pat. No. 5,495,221 by Post; U.S. Pat. No. 5,514,923 by Gossler et al; U.S. Pat. No. 5,525,894 by Heller; U.S. Pat. No. 5,614,777 by Bitterly et al; U.S. Pat. No. 5,681,012 by Rosmann et al; U.S. Pat. No. 5,705,902 by Merritt et al; U.S. Pat. No. 5,712,549 by Engel; U.S. Pat. No. 5,717,303 by Engel; U.S. Pat. No. 5,729,118 by Yanagisawa et al; U.S. Pat. No. 5,754,425 by Murakami; U.S. Pat. No. 5,783,885 by Post; U.S. Pat. No. 5,798,591 by Lillington et al; U.S. Pat. No. 5,847,480 by Post; U.S. Pat. No. 5,861,690 by Post; U.S. Pat. No. 5,880,544 by Ikeda et al; U.S. Pat. No. 5,883,499 by Post; U.S. Pat. No. 5,969,446 by Eisenhaure et al; U.S. Pat. No. 5,977,677 by Henry et al; U.S. Pat. No. 5,977,684 by Lin; U.S. Pat. No. 6,011,337 and U.S. Pat. No. 6,049,149 by Lin et al; U.S. Pat. No. 6,121,704 by Fukuyama et al; U.S. Pat. No. 6,130,831 by Matsunaga; U.S. Pat. No. 6,137,187 by Mikhail et al; U.S. Pat. No. 6,166,472 by Pinkerton et al; U.S. Pat. No. 6,246,146 by Schiller; U.S. Pat. No. 6,259,233 by Caamano; U.S. Pat. No. 6,262,505 by Hockney et al; U.S. Pat. No. 6,288,670 by Villani et al; U.S. Pat. No. 6,388,347 by Blake et al; U.S. Pat. No. 6,407,466 by Caamano; U.S. Pat. No. 6,750,588 by Gabrys; U.S. Pat. No. 6,815,934 by Colley; U.S. Pat. No. 6,858,962 by Post; U.S. published patent application 2006/0208606 by Hirzel.

Additional patents by the present inventor, the teachings which are additionally incorporated herein by reference, include: U.S. Pat. Nos. 4,085,355 and 4,520,300 by Fradella; U.S. Pat. Nos. 6,566,775 and 6,794,777 by Fradella.

OBJECTS OF THE INVENTION

There is a great need for generators that are more compatible with widely variable speed and torque rotary shaft power from wind turbines. Generators having such useful attributes can enable vast sustainable power systems, without shortcomings associated with prior art power generators. A few such examples are described next.

Optimally loaded wind turbines can harvest sustainable mechanical power from highly variable winds. My present invention generator can convert highly variable shaft power to usable electric power having regulated current and voltage. An embodiment for wind power efficiently generates electric power that is proportional to the third power of speed, over a very broad speed range. It would greatly enhance power quality and produce approximately double the prior art generator electric power energy yields from wind, by harvesting electric power during prevalent low wind speeds and continue to harvest electric power over the entire wind speed spectrum.

Moreover, its scalability facilitates optimal wind turbine loading, without incurring re-tooling expenses to achieve a broad power rating range. The importance of optimal loading is best explained by considering extreme mismatch between a wind turbine and the generator it drives: Potential wind turbine output power is not substantially harvested if generator power capacity is so slight that the wind turbine coupled to it has minuscule torque load. Conversely, output power is zero when generator loading is so high that it causes the wind turbine to stall. Those versed in the art of generating electric power from wind turbines know that potential wind turbine output power as a function of wind speed is a continuous function, whose maximum power yield corresponds to optimal loading, facilitated by matching a generator to the wind turbine that can best drive it, over a broad wind speed range. Said speed and load scaling and matching is a primary attribute of the present invention.

Considering another alternate embodiment, a generator that can convert variable-speed pedal power from a recumbent cyclist, in an electric vehicle, that charges onboard batteries and thereby extends the practical vehicle range, while affording a healthy exercise option, is an example of an alternate embodiment of the present generator invention. Considering yet another alternate embodiment example, fitness exercise gyms, having exercise equipment connected to such generators, could meet their onsite power needs and perhaps even return power to a utility grid. Considering another application, wave motion and water flow from rivers and streams is variable. Nevertheless, locations exist where the present generator invention can afford an opportunity for environmentally responsible electric power therefrom.

Accordingly, a general objective of the present invention is to provide a generator, which does not require speed-up gearing to increase its shaft speed, and which has zero cogging torque. A main objective is to provide a generator, which can efficiently generate better quality electric power, with controlled current and voltage, especially at very low shaft speeds, over a very broad speed range. It also should facilitate optimal wind turbine loading. Its shaft would preferably be powered by wind turbines having means to limit maximum speed by varying blade pitch or deflecting wind from the blades when a desired maximum speed is reached. When that is not feasible, a friction brake may be added to limit turbine shaft speed.

Power generation from wind turbines is expected to be a major application for the present invention. Since turbine shaft speed usually is substantially proportional to wind speed, and shaft torque is usually proportional to wind speed squared, loading the turbine shaft and outputting electric power so it is proportional to the third power of shaft speed, will extract maximum power over a very broad wind speed range, from essentially all types of wind turbines.

Accordingly, a specific objective for a primary embodiment of the present invention, especially at relatively low typical wind speeds, is to regulate output current and voltage, so that useful regulated electrical output power is proportional to the third power of shaft speed.

Another objective is to provide a variable speed generator responsive to user selected torque settings, which can efficiently generate electric power at requisite voltage, from human power, to pedals driven by a driver who would benefit from recumbent cycling exercise. This would also increase driving distance range and thereby appreciably enhance ultralight electric road vehicles having on-board batteries and a plug-in charger, photovoltaic exterior top surfaces, and brushless regenerative ultra-efficient motors in wheels, which include radial-compliant springs to hold relatively large diameter tire rims. Such an electric road vehicle is one of many examples of practical, sustainable, environment-responsible, low-cost transportation means that would be enhanced by the present invention generator.

Means to achieve said objectives and attributes of the present invention are described and illustrated herein, by explanations that will be clear to multi-disciplinary science engineers and to those versed in the art of electric power generators. It will be understood that those versed in the art can apply various other implementations and parts, to achieve the means and functions described herein.

BRIEF SUMMARY OF THE INVENTION

The present generator invention is intended to provide useful electric power, from rotary mechanical power, over a very broad speed range, by combining a coreless (i.e., having no salient high-permeability iron cores) permanent-magnet assembly, with integral electronics to control its stator winding current. This coreless assembly is constituted by axial-field rotor magnets, affixed within rotor disks, forming an alternated pole circular array. With rotation, the magnets provide a time-varying magnetic field pattern that interacts with preferably 2-phase stator windings in the assembly. Said windings are connected to integral PWM (Pulse-Width-Modulation) high-frequency-switching control electronics in a boost regulator configuration.

Substantially sinusoidal voltage generated, across the stator winding terminals, has amplitude and frequency proportional to rotor disk rotational speed. Said voltage causes current in the stator windings and a series inductance, controlled by PWM power-switching transistors, in series with the windings and the inductance when ON, that are switched ON/OFF at a very high frequency. When the transistors are switched ON, the stator voltage causes current to increase through the series inductance. Then, each time the transistors are switched to OFF, free-wheeling diodes provide an alternate path to high-frequency filter capacitors in parallel with a DC load, for resulting high-frequency current pulses, sustained by the series inductors. Current through the stator windings and series inductance is thus controlled by high-frequency PWM switching, so it is substantially sinusoidal, in phase with the voltage across the stator windings, and includes an inherent (preferably very small) triangular-wave component at the relatively high PWM ON/OFF switching frequency.

Current pulses through the diodes, from each of the 2 phases, are filtered by the capacitors, and preferably also by a small series inductor between the capacitors and the DC load. The filtered current from each phase is substantially a sinusoid, having a frequency double that of the sinusoidal stator voltage and current, and a DC average half the rectified sinusoidal current peak value. Said rectified sinusoidal currents from each phase have opposite polarities relative to each other. Thus, when the current from one phase is at its peak, current from the other phase is zero. Main system elements and combinations, of the present invention, include:

(1) Rotor magnets to provide a rotating nearly sinusoidal field pattern to each phase of a coreless stator winding, with relative motion therebetween, as the rotor spins, without magnetically cycling iron or magnets in their closed magnetic flux paths, and thus not incurring magnetic hysteresis losses and cogging torque.

(2) Rotor magnet sensors, responsive to rotor angle, each aligned with a respective stator conductor phase, to each provide an alternating nearly sinusoidal feedback signal responsive to rotor angle, used by integral electronics to control respective stator winding current.

(3) Current sensors, to each provide a respective current feedback signal over a very broad dynamic range, corresponding to respective stator conductor current.

(4) Signal processing electronics, normally responsive to the rotor magnet and current sensors, and to DC voltage feedback, to control stator current by PWM and thereby efficiently generate regulated DC current and voltage, from wide speed range rotational power, by boost regulation (fly-back inductor and free-wheeling diode pulse current generation and rectification filtered by high-frequency pulse averaging capacitors). This enables useful DC power generation at requisite DC voltage over a very broad speed range.

(5) Scalable combinations of these elements, that facilitate a wide power range, without need for many different size parts and the tooling required to manufacture them.

Improvements to the prior art will be apparent to those versed in the art and in the various engineering disciplines encompassed by it, from the following description of the invention, when considered in conjunction with the accompanying drawings, wherein:

BRIEF DESCRIPTION OF THE SEVERAL VIEWS OF THE DRAWINGS

FIG. 4 shows a typical location wind speed Rayleigh statistical distribution, normal wind turbine mechanical power as a function of wind speed, and resulting predicted available wind turbine energy yield over the entire wind speed range.

DETAILED DESCRIPTION OF THE INVENTION

Figure 1:
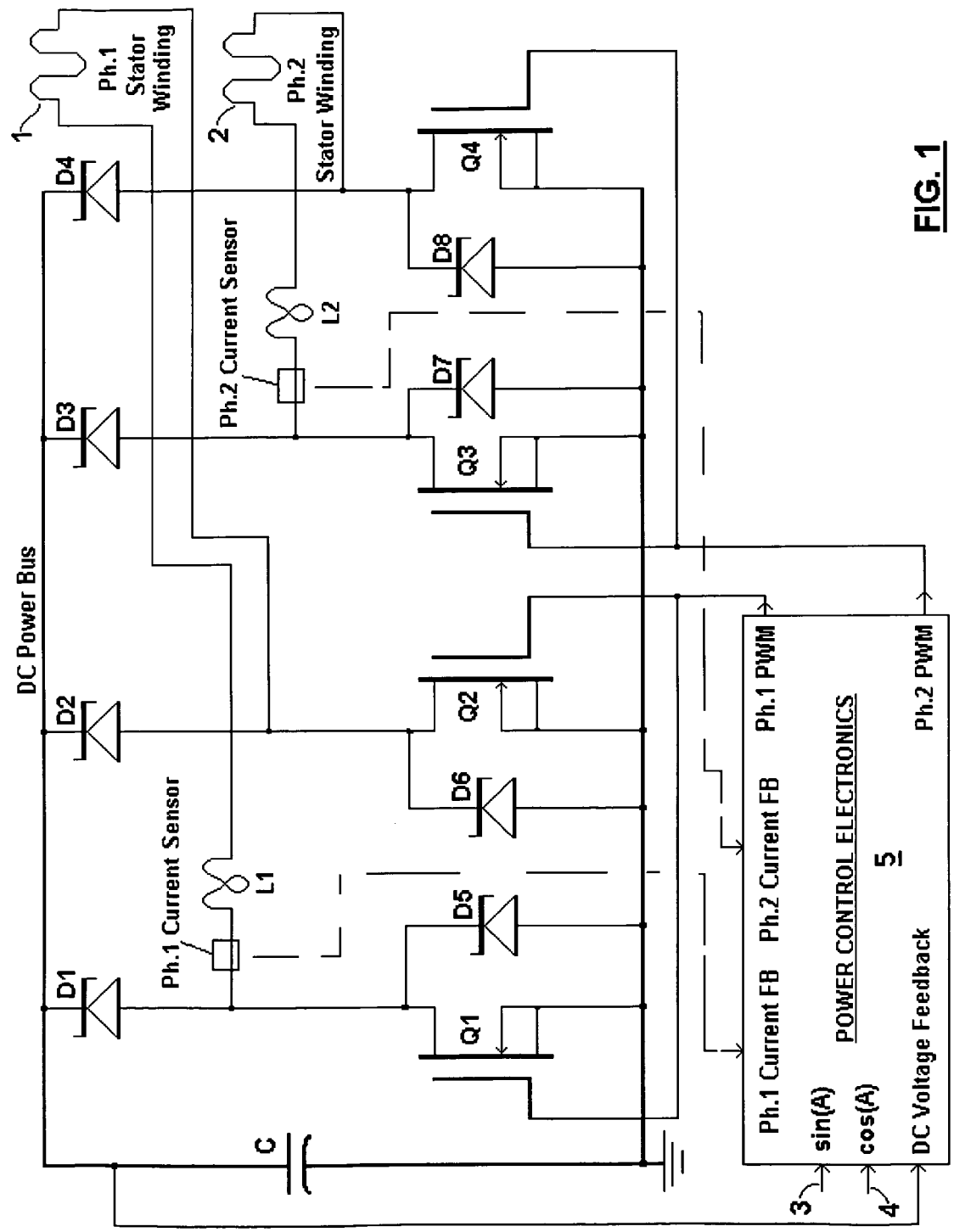
FIG. 1 illustrates the main features of my present invention, by a functional block diagram and schematic, which concisely conveys its integrated system elements. It will be clearly understood by electronic engineers and those versed in the art.

Main elements and combinations of this new generator are set forth herein and illustrated in FIG. 1. This invention implements a new cooperative combination of elements based upon several engineering disciplines. They include electronics, magnetics, feedback control systems, thermal, magnetic and stress finite-element-analysis, SPICE dynamic circuit and system simulation, rotational dynamics, aerodynamics, hydrodynamics, and materials science. Each discipline has standard terminology and illustration methods, to convey its structures and system combinations in the most concise and understandable way to persons versed in those disciplines. The descriptions and illustrations herein are intended to convey the most essential features of the present invention accurately, clearly, and concisely. Features set forth in prior art, with new improvements facilitated by the present invention, are herein briefly described, to explain differences and to provide clear comparisons. While dimensions, tolerances and the like are presented throughout this document to facilitate better understanding of the design of the preferred embodiment, it will be understood that other dimensions, tolerances and the like are additionally contemplated and will be clearly apparent to those versed in the appropriate arts and sciences.

Manifested in this generator assembly and integral power control electronics, main elements and combinations of the present invention are set forth herein and illustrated in FIG. 1.

This generator system provides a unique combination of a coreless axial-field generator and cooperative power control electronics. The axial-field generator has a closed magnetic field, produced by a circular array of alternated pole axially magnetized permanent magnets, affixed within two or more rotor disks. This magnetic field interacts with pulse-width-modulation (PWM) controlled preferably 2-phase current through 2-phase radial stator winding segments, in one or more coreless stator disks juxtaposed between the rotor disks.

Since the stator windings are not surrounded by high-permeability iron cores, forces due to current through their radial segments, interacting with the magnetic field, act directly on the stator windings. In contrast, most prior art generators forces act mainly on iron core poles. Disks holding the stator windings are non-magnetic and electrically non-conductive.

The stator disks must have sufficient thermal conductivity to transfer heat due to stator current copper losses, from the stator windings to the generator exterior. Additive molding materials and methods to increase thermal conductivity of electrically non-conductive materials are broadly available from many commercial sources. Powdered aluminum is one exemplary and widely used additive, which is mixed with injection-molded resins. The small aluminum particles are pre-treated so a thin non-conductive surface layer covering each particle insulates it from adjoining particles, resulting in an electrically non-conductive mix that has relatively high thermal conductivity.

The generator assembly design and manufacturing processes of the present invention enables stator disks having considerably higher and consistent thermal conductivity, compared to other electrically non-conductive materials. Moreover, these generator assemblies are readily scalable, by varying their number of rotor and stator disks, to optimize load matching with various turbines while minimizing production and inventory costs.

Most significantly, this generator system does not have cogging torque, magnetic hysteresis power loss, and eddy loss that would otherwise result from iron cores of prior art salient pole generators. With integral electronics boost regulation, relatively large diameter rotor and stator disk assemblies, and relatively large number of poles thereby facilitated, need for speed-up gearing is also obviated. Prior art generator cogging torque and gearing stiction prevent shaft rotation at the low torque levels produced at low wind speeds, so said prior art can generate electric power only during high wind speeds. Therefore, prior art generators relinquish power over a prevalent wind speed range. Conversely, the present invention provides steady power having both current and voltage control, compared to prior art generators that too frequently need to be disconnected or generate high power bursts with no current or voltage control. These power characteristics are known by electrical engineers and by the electric power industry as factors that determine merit and a measure of power quality.

Stator winding radial segments of the present invention are in a magnetic field varying with both position and time (whereas, in most prior art generators, the magnetic field flux is mainly confined within surrounding iron poles). Therefore, the stator winding conductor options are a design trade-off, between spiral Litz wire having many individually insulated strands, so it does not incur substantial eddy losses as the rotor spins, and single-strand magnet wire. Besides lower eddy losses, multi-strand wire is easily formed, without specialized tooling. However, spiral Litz wire, and a sleeve around it, has a substantially larger diameter than equivalent wire-gauge single-strand magnet wire, and is considerably more costly.

Moreover, eddy loss in stator conductors is not a significant problem at low rotor speeds (where maximum generator efficiency is most important). Therefore, single-strand magnet wire, formed by new methods enabled by the new stator disk geometric details of the present invention, provides a compact lower cost option. The stator windings will preferably be preformed, and then placed in a mold, to become the functional electromagnetic element of each injection-molded stator winding disk. Magnet wire having a square cross-section is preferable over a round cross-section, mainly because it accommodates about 20% more copper area in a given space.

Figure 11A:
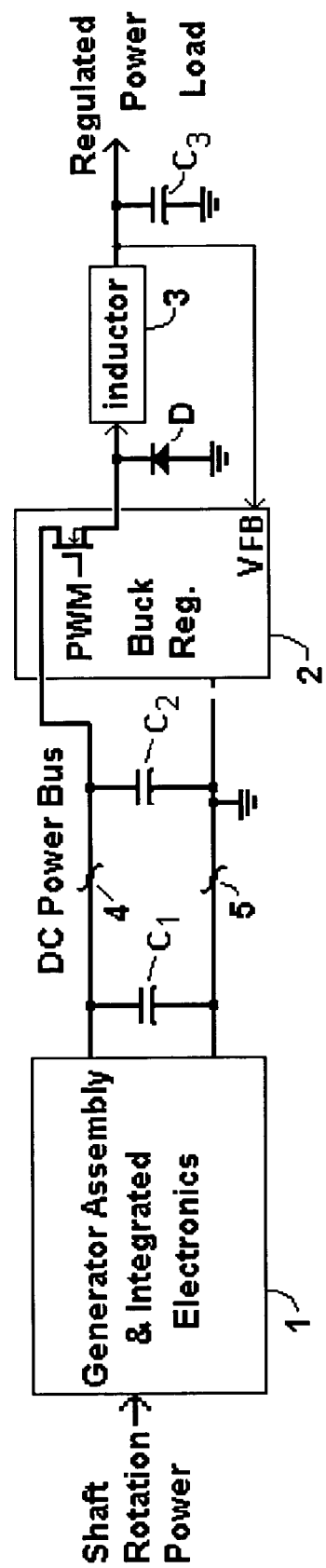
FIG. 11A illustrates a buck regulator in series with the FIG. 1 generator DC output, to limit load current and voltage, for use with wind turbines having substantially no speed limiting means.

Additionally, the present invention includes integral electronics, to enable high-efficiency controlled output current and voltage, over a shaft speed range of at least 10-to-1. For shaft drives having speed with no limits, whence the generator stator winding peak voltage (generated by shaft rotation) exceeds the desired DC output voltage, a commercially available buck regulator 2 can be added to generator 1, to maintain requisite load current and voltage, as shown in FIG. 11A. Alternatively, to provide high quality, current regulated 3-Phase power, synchronized at a desired phase shift, to a 3-Phase power grid, a commercially available DC-to-AC 3-Phase power inverter 2 can be added to generator 1, as illustrated in FIG. 11B.

With reference to FIG. 11A, the generator of FIG. 1 is designated block 1. Its output voltage, which increases proportional to shaft speed when driven beyond its control range, is applied to the DC Power Bus, with capacitance C1 to power ground, and input to commercially available Buck Regulator 2. The Buck Regulator preferably has internal PWM current control and is also responsive to negative voltage feedback. Its PWM output applies pulses at voltage peaks essentially equal to the DC Power Bus voltage level, $V_{DC}$. Inductor 3 maintains current, with minimal high-frequency PWM ripple, to the Regulated Power Load. Free-wheeling diode D provides a current path from power ground, when the Buck Regulator output PWM power switch is OFF, such that Regulated Power Load Voltage=$(V_{DCload})*(T_{on})/(T_{on}+T_{off})$. Input capacitor C2 should have low equivalent resistance and inductance, to filter voltage ripple due to the current pulses drawn by Buck Regulator 2. Capacitors C1 and C2 facilitate relatively large distance between generator 1 and buck regulator 2. Possible slip rings 4 and 5, in series with the two conductors between 1 and 2, are intended to accommodate unlimited axis direction change of axial-flow wind turbines, in response to wind direction changes. The rotational axis of said turbines is substantially maintained parallel to wind direction. Output capacitor C3 need only filter a slight ripple current. Inductor 3 preferably includes a ferrite core having low losses at Buck Regulator 2 relatively high-frequency PWM switching.

Figure 11B:
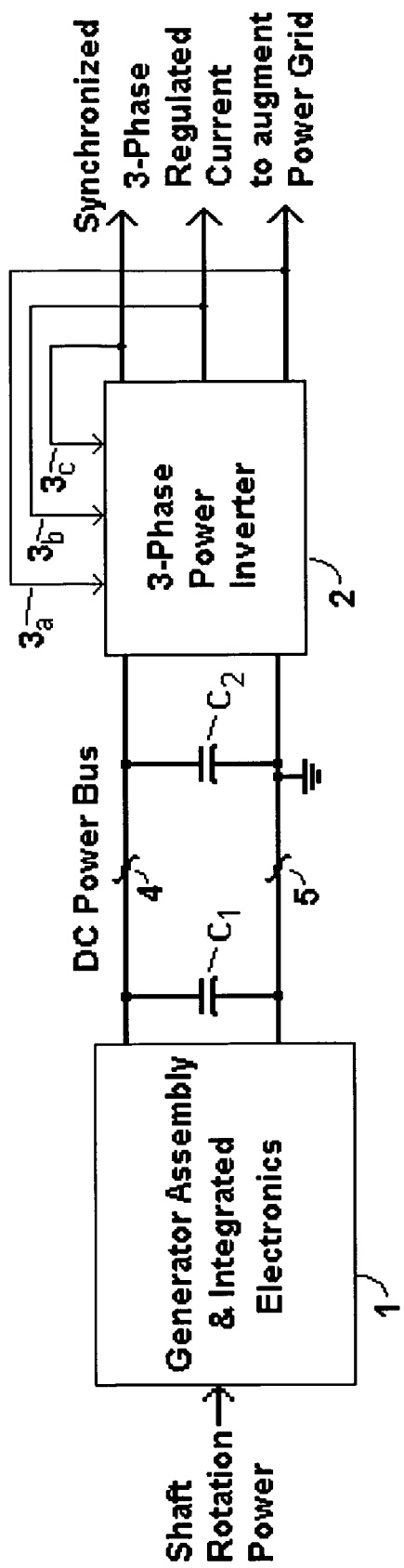
FIG. 11B illustrates a 3-Phase inverter in series with the DC Power Bus output of the generator shown in FIG. 1, to provide high quality, regulated and synchronized current, from variable-speed wind turbines and various shaft drive sources, for 3-Phase power grids.

With reference to FIG. 11B, the generator of FIG. 1 is designated by block 1. Its output voltage, which increases proportional to shaft speed if driven beyond its control range, is applied to the DC Power Bus, with capacitance C1 to power ground, and preferably fed to a commercially available 3-Phase Power Inverter 2. For a "Y" connected 3-Phase power grid, having 3 balanced lines with their respective sinusoidal peak voltages $V_{ac}$ relative to "neutral" (usually "ground"), the inverter, responsive to the voltages on each of the 3 grid power lines 3a, 3b, and 3c, provides regulated sinusoidal peak currents $I_{ac}$ that are synchronized to said respective voltages. Current fed to the grid can be selectively in-phase with the grid voltage, leading phase, or lagging phase. It will be understood by those versed in the art, that respective averaged current $I_{DC}$ at voltage $V_{DC}$, drawn from generator 1, by 3-Phase Inverter 2, feeds power to Inverter 2 equal to $(I_{DC})*(V_{DC})$. Further, it can be shown that $(I_{DC})*(V_{DC})=(1.5)*(I_{ac})*(V_{ac})$. Yet further, it can be shown that current drawn by 3-Phase Inverter 2 has essentially no 60-Hz or 120-Hz ripple components. However, said current will be drawn as high-frequency PWM pulse current, requiring relatively small filter capacitor C2. Slip rings 4 and 5 may also be included, to facilitate unlimited horizontal-axis wind turbine yaw angle with wind direction change.

Conversely, a single-phase 60-Hz power inverter draws current $(I_{DC})*[1+\sin(wt)]$, where frequency (w) is 120-Hz. This requires a relatively large capacitance, to filter the sinusoidal component of current drawn from DC sources that are effectively current-regulated, such as photovoltaic solar panels, and the flywheel batteries described in my U.S. Pat. Nos. 6,566,775 and 6,794,777. For sinusoidal 60-Hz peak output voltage $V_{ac}$, a single-phase inverter provides a regulated sinusoidal peak current $I_{ac}$ to augment AC line power, which is synchronized to the AC line voltage. With adequate capacitance to filter the 120-Hz current component drawn from generator 1, it can be shown that $(I_{DC})*(V_{DC})=(0.5)*(I_{ac})*(V_{ac})$.

Those versed in the art will understand that the same generator assembly of my present invention, combined with power control electronics different from the electronics set forth herein, can function as a variable-speed reversible brushless regenerative motor. Detailed descriptions of such motor system configurations are taught in my U.S. Pat. No. 4,085,355 "Variable-speed Regenerative Brushless Electric Motor and Controller System", and my U.S. Pat. No. 4,520,300 "Brushless Ultra-Efficient Regenerative Servomechanism," the contents of each which were incorporated hereinabove by reference.

The general embodiment of my present invention is illustrated by FIG. 1, which shows integration of the generator assembly, electronics components connected thereto, and power control electronics. It is applicable to all embodiments of the invention. Equations shown below are considered in conjunction with the current and voltage waveforms shown in FIG. 10A-B-C and the remaining figures, and will be clearly understood by electronic engineers and by those reasonably versed in the art.

With reference to FIG. 1, Phase 1 stator current is controlled by pulse-width-modulated (PWM) Q1 and Q2 switching; concurrently with like Phase 2 stator current control by Q3 and Q4. The 2-phase current control circuits, connected to a DC power bus, by diodes D1, D2, D3, and D4, results in PWM pulse currents that, when PWM pulses are filtered, are equal to $I_a \sin^2(wt)$ from Ph.1 stator winding 1 and $I_a \cos^2(wt)$ from Ph.2 stator winding 2. Said filtered bus currents combine so generated currents are $I_a=V_s I_s/V_{DC}$, with virtually zero ripple component. Electrical frequency (w) is proportional to rotor spin speed, which may vary over a normal 10-to-1 power generating range. The 2-phase circuits in FIG. 1, including high-frequency preferably ferrite core inductors L1 and L2, the two current sensors, along with their power control electronics, are known in the art as boost regulators. Prior art generators, intended to supply DC current (and only at relatively high speed over a narrow speed range), need costly large filter capacitors. The present invention obviates need for such capacitors, by combining (after high-frequency PWM filtering) current from the respective 2 phases, substantially $I_a \sin^2(wt)+I_a \cos^2(wt)=I_a$. It will be noted that the inverter shown in FIG. 11B is 3-Phase. A single-phase inverter, to supply 60-Hz AC power, would draw current from the generator in FIG. 1 (or from any DC source that supplies its power) with considerable 120-Hz ripple. So, for such a requirement, capacitor C2 would need to be substantially larger than when the generator is used to supply DC power for poly-phase inverters.

Current through stator windings 1 and 2 are essentially in phase with voltage generated in the respective windings, due to PWM current control, responsive to two Hall sensors, each aligned with a respective stator winding and which detect rotor angle, to provide respective feedback signals sin(A) and cos(A) denoted 3 and 4 in FIG. 1. Signal processing electronics in Power Control Electronics 5 combine variables 3 and 4 with control variables specific to the various embodiments of the present invention. The resulting signals, applied to two respective minor-loop current feedback circuits, having negative feedback denoted Ph.1 Current FB and Ph.2 Current FB, produce signals that control respective Ph.1 PWM and Ph.2 PWM outputs. These PWM outputs drive Q1 and Q2 gates, connected in parallel as shown, at variable PWM duty-cycle $T_{on}/(T_{on}+T_{off})$ to attain desired current through Ph.1 Stator Winding 1. Meanwhile, Q3 and Q4 gates, connected in parallel, are likewise controlled, to attain desired current through Ph.2 Stator Winding 2. Said current control can be attained only when the DC Power Bus voltage exceeds the maximum level of peak voltage generated across respective stator windings. That result is illustrated by the nearly sinusoidal current and voltage waveforms across each respective 2-Phase stator winding terminal pair, as a function of time, and resulting averaged current (from capacitor filtered high-frequency PWM current pulses) fed to the DC power bus, as illustrated in FIG. 10. The combined averaged currents, fed to the DC power bus, have effectively zero ripple components when peak stator voltage is less than the DC power bus voltage. This will be understood by those versed in the art.

It can be readily shown that the combined PWM current pulses from each of the two phases, averaged by high-frequency ceramic or film capacitors, can be reduced somewhat by staggering ON/OFF timing for one of the PWM drivers relative to the other phase. Said current pulses would then be staggered (i.e., alternated from each phase). However, a design compromise between less capacitance enabled by said staggered pulses and the additional signal processing needed to achieve that result, tends to favor the circuits shown and described herein. This preference is partly because current from one phase is zero when current from the other phase is maximum and partly because too much added circuitry is needed to reduce the pulse currents only a small amount that can be accommodated by only slightly more high-frequency filter capacitance.

Whenever the maximum voltage generated across respective stator windings exceeds the DC Power Bus voltage, the generator will charge capacitors in parallel with the DC Power Bus, to substantially the stator winding voltage peaks, by full-wave rectifier action. Then, if shaft speed exceeds levels where the DC Voltage Feedback in FIG. 1 can control generator output voltage by boost-regulation, a buck regulator would preferably be added in series with the DC Power Bus, as shown in FIG. 11A. Additionally, Q1-Q4 and D1-D4 and capacitance C voltage ratings must be accordingly increased. DC-to-DC buck regulators are available commercially. They achieve regulated DC output voltages at various power levels, at about 95% efficiency, by straightforward PWM circuit means. DC-to-AC power inverters can also provide buck-regulation, at about 95% efficiency. Preferably, said inverters would be poly-phase, and synchronized to grid power lines they would feed, as shown in FIG. 11B. Single-phase inverters would draw current having very high ripple, from the DC Power Bus. So they would not be a favorable peripheral for use with this generator. With buck regulation inverters, the DC Power Bus voltage, fed to the DC-to-AC inverters, must be greater than the peak AC voltage on the power grid fed by the generator.

Figure 2:
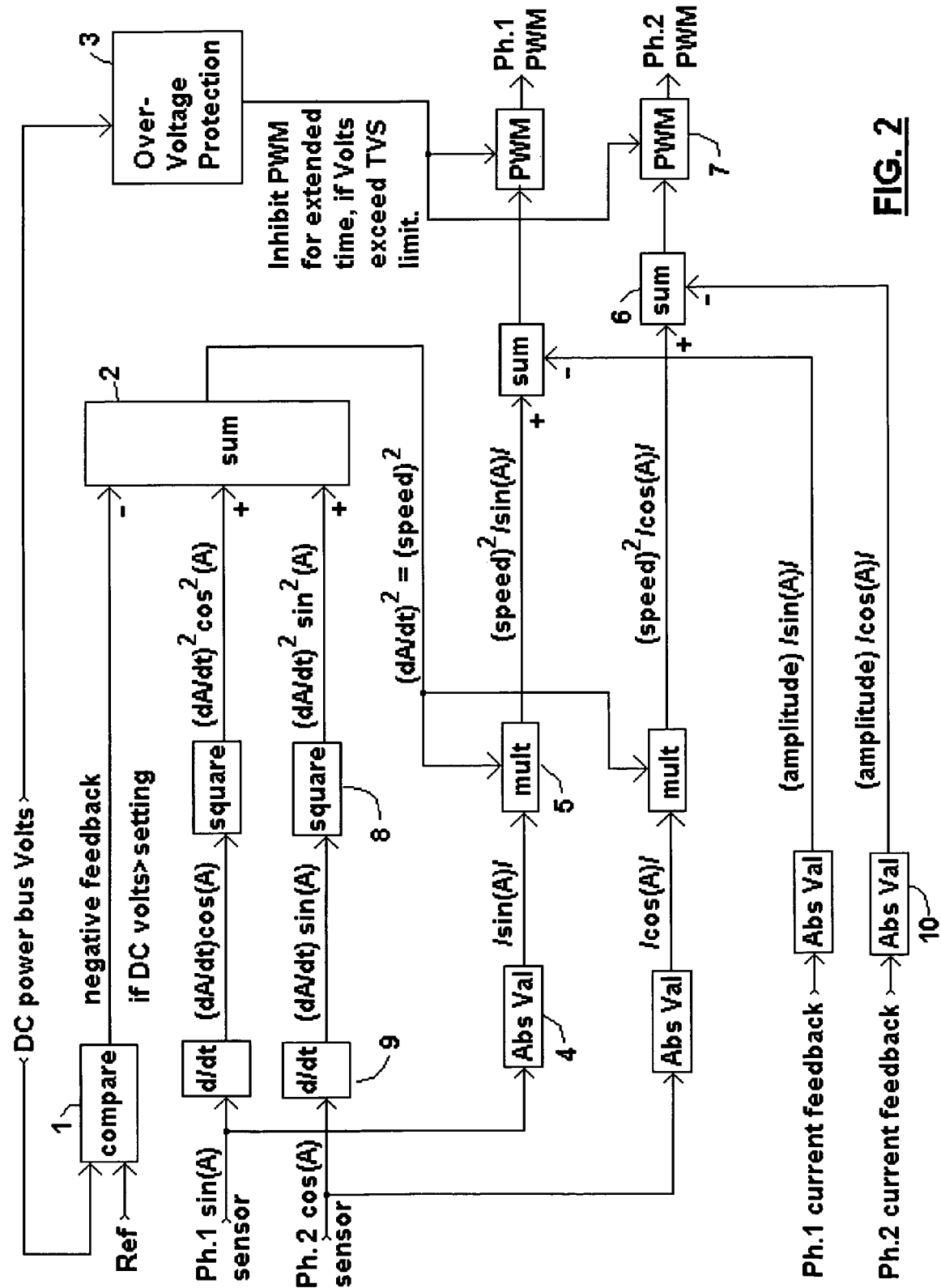
FIG. 2 illustrates the main features of a present invention embodiment intended as a generator for use with wind turbines, by a detailed functional circuit schematic of the Power Control Electronics shown in FIG. 1. It will be clearly understood by electronic engineers.

A preferred embodiment of the Power Control Electronics 5 in FIG. 1, which does not include a buck regulator in series with its output, is illustrated by the functional block diagram FIG. 2. It is configured as a generator for wind turbines preferably having means to limit rotation speed by varying their blade pitch or limiting wind-speed channeled to them by exterior means.

The Compare function block 1 in FIG. 2 may be implemented by a differential amplifier circuit, including logic that inhibits negative voltage feedback from the DC power bus, unless the bus voltage exceeds a prescribed voltage reference (Ref) setting. Ph.1 rotor angle A sensor feedback signal sin (A) is applied to rate function block 9, (d/dt), which provides its time-derivative (dA/dt) cos(A), and is applied to AbsVal function block 4, which provides its absolute value /sin(A)/. The rate signal is applied to square function block 8, which provides as its output a squared rate (the second power of rotational speed) signal $(dA/dt)^2 \cos^2(A)$.

Likewise, Ph.2 rotor angle sensor feedback signal cos(A) is processed by like electronics, to provide signals $(dA/dt)^2 \sin^2(A)$ and /cos(A)/. Respective squared rate signals are then added, with negative DC voltage feedback, by the sum function block 2. Since $\sin^2(A)$ and $\cos^2(A)$ is equal to 1, output from function block 2 is the square of speed, with virtually zero ripple. This $(speed)^2$ signal is applied to multiplier function blocks 5, along with respective inputs /sin(A)/ and /cos (A)/, to provide respective output signals $(speed)^2$/sin(A)/ and $(speed)^2$/cos(A)/.

Substantially sinusoidal Ph.1 current feedback signal is applied to function block 10, (AbsVal), to provide the signal variable Ph.1 stator current amplitude /sin(A)/. Likewise, the Ph.2 stator current feedback signal is converted to Ph.2 stator current amplitude /cos(A)/. Each of these absolute value signals is applied to respective difference amplifiers, shown as sum function blocks 6. This signal processing provides negative current feedback, to respective minor feedback loops, whose outputs modulate respective PWM function blocks 7. The PWM circuits provide ON/OFF drive (Ph.1 PWM), to Q1 and Q2 in FIG. 1, for Phase 1 stator current control proportional to $(speed)^2$ and ON/OFF drive (Ph.2 PWM) to Q3 and Q4 for Phase 2 stator current control that is likewise proportional to $(speed)^2$.

Figure 9A:
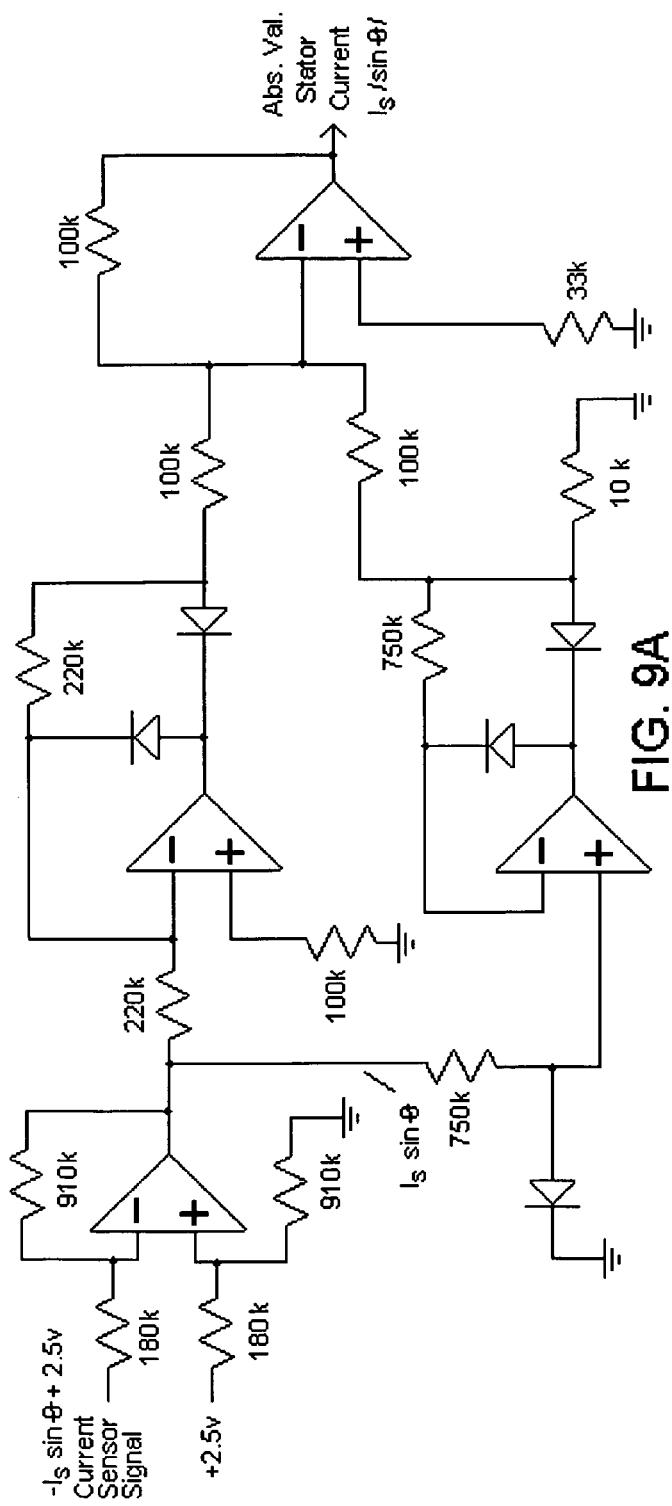
FIG. 9A-B shows two circuits that respectively provide from a current sensor having a nominal 2.5 vdc offset at zero current and 1 v to 4 v maximum range output signal corresponding to respective peak current at plus and minus polarity, a precise and very broad range output voltage signal proportional to the absolute value of said current.
Figure 9B:
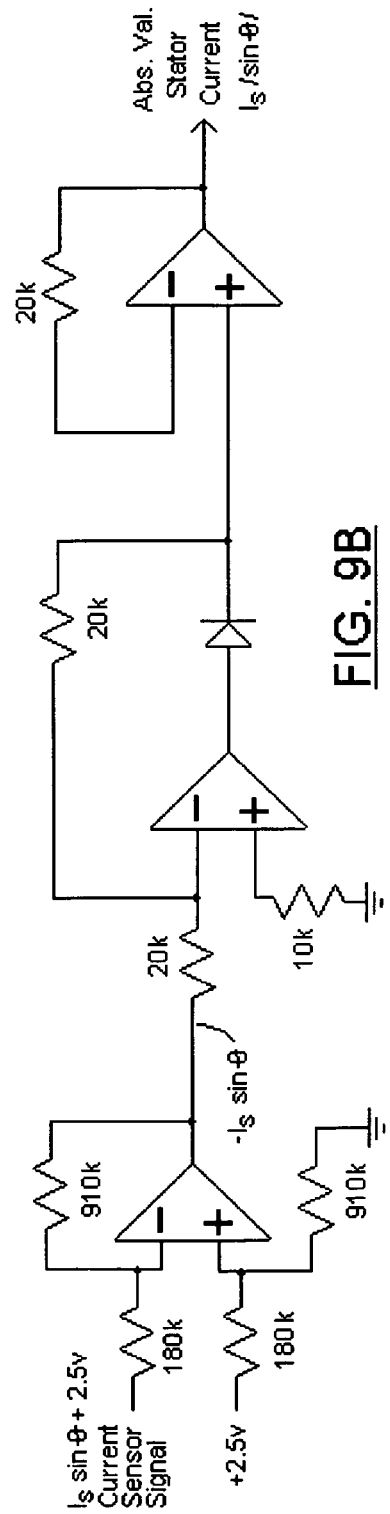

Abs Val function blocks 4 and 10 in FIG. 2 may be implemented by various circuits, depending upon respective signal dynamic range accuracy needed. FIG. 9A-B illustrates two circuits that provide the absolute value, which is precise over a very broad range, of output signals from stator current sensors in this generator. Note that the diodes are inside the operational amplifier feedback loops, which compensates for diode forward voltage drop. Electronic engineers who design analog circuits are familiar with such techniques, and with their considerable circuit enhancements and various limitations.

Figure 3:
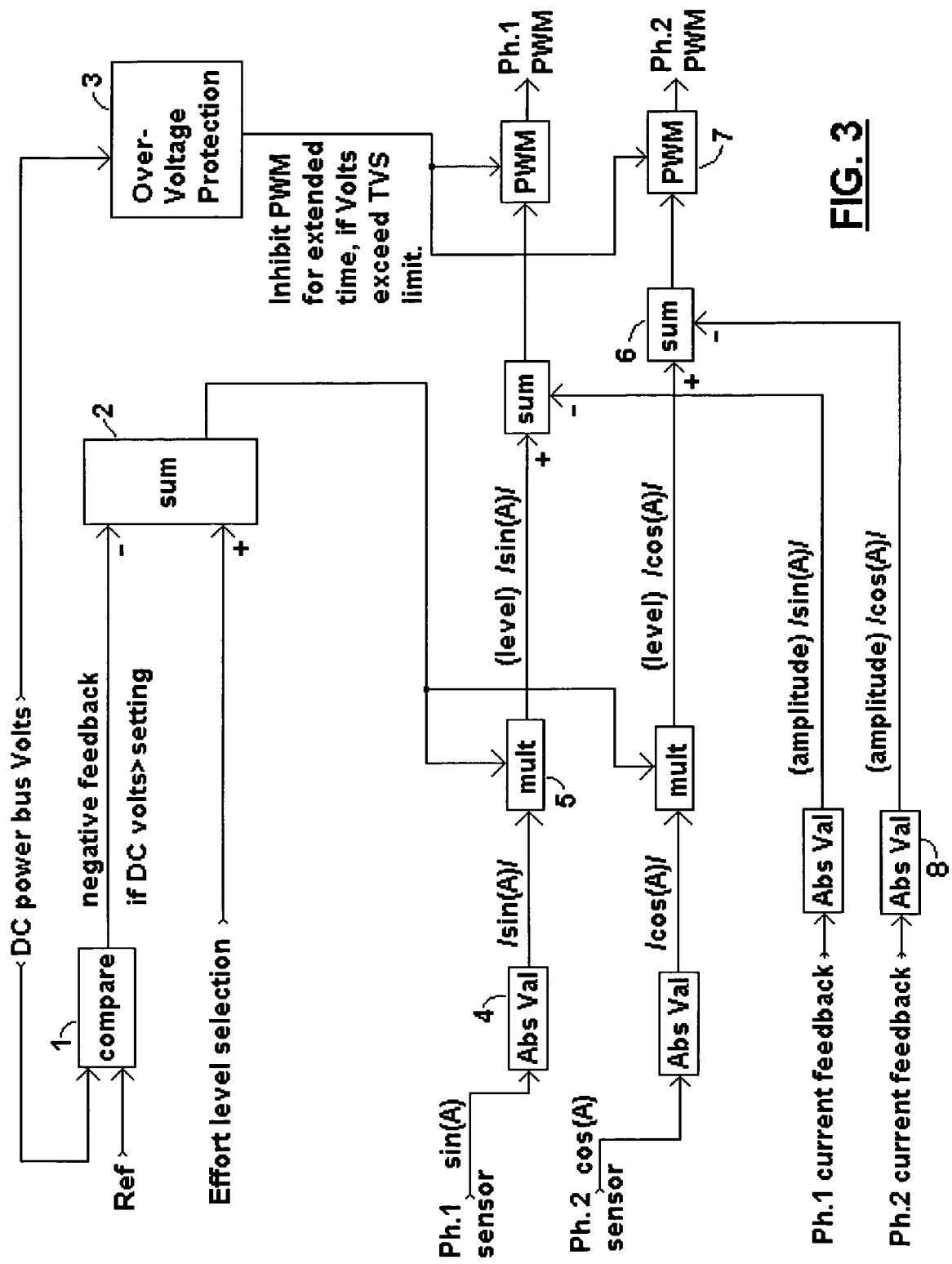
FIG. 3 illustrates the main features of an embodiment intended mainly as a generator for use with human-power-assisted electric vehicles, by a detailed functional circuit schematic of the Power Control Electronics shown in FIG. 1.

FIG. 3 illustrates a functional block diagram for the Power Control Electronics 5 in FIG. 1, which is intended for general applications. Like the circuit in FIG. 2, compare block 1 is also responsive to a reference command (Ref) and to the DC power bus voltage. However, in FIG. 3, the resulting negative voltage feedback is then compared by sum circuit 2 (which is preferably implemented by an operational amplifier circuit) with an Effort level selection signal. Abs Val 4 likewise provides respective absolute value /sin(A)/ and /cos(A)/ signals from Ph.1 and Ph.2 preferably Hall-effect sensor output signals. Abs Val 8 circuits provide the absolute values of respective Phase 1 and Phase 2 current feedback signals, which serve as current feedback to respective sum 6 circuits, which are responsive to level commands from respective multiplier blocks 5. Thus, stator current level control is synchronized with respective stator winding voltage, by PWM blocks 7, which provide respective Ph.1 PWM and Ph.2 PWM high-frequency ON/OFF drive to Q1-Q2 and Q3-Q4 shown in FIG. 1.

Over-Voltage Protection (function blocks 3), shown in both FIG. 2 and FIG. 3, is a vital and much preferred element of the integrated electronics, which protects the electronics if the load connection is suddenly opened. The negative voltage feedback to block 1 is generally processed by electronics that incur too much delay to always prevent damage from over-voltage. Therefore, a Transient Voltage Suppressor (TVS) device that is commercially available from various suppliers conducts within pico-seconds whenever its conduction voltage is exceeded. The TVS is basically a very large junction area zener diode. Its thermal capacity, with parallel filter capacitors, is sufficient to absorb without damage all energy stored in inductors L1 and L2 shown in FIG. 1. Whenever the TVS conducts, current through it is sensed by a circuit that inhibits PWM 7 from driving Q1, Q2, Q3, and Q4 for an extended time, thereby stopping the normal boost regulation of the generator electronics, and allowing sufficient time for TVS heat to dissipate.

Power from Ph.1 stator winding is effectively the root-mean-square (rms) value of its stator current multiplied by its rms stator voltage=(Ph.1 peak current)*(Ph.1 peak voltage)*(0.5). Likewise, Ph.2 power=(Ph.2 peak current)*(Ph.2 peak voltage)*(0.5). Since Ph.1 and Ph.2 are essentially equal in magnitude and time displaced by 90° phase relative to each other, the Ph.1 plus Ph.2 power sum is (peak current)*(peak voltage) of either Phase 1 or Phase 2.

Inasmuch as peak current and voltage of Ph.1 and Ph.2 are equal to each other, and each is sinusoidal with 90° relative phase, and $\sin^2(A)+\cos^2(A)=1$, and the sum of power from Ph.1 and Ph.2 equals power fed to the DC power bus $I_{DC}*V_{DC}$, then, for either phase:

(peak stator current)*(peak stator voltage)= $(I_{DC}*V_{DC})$.

The above equation explains why controlling peak stator current so it is proportional to speed squared, when multiplied by peak stator voltage, which is proportional to speed, results in output power $(I_{DC}*V_{DC})$ proportional to the third power of speed. Coupling this generator to a wind turbine capable of changing its configuration to limit its speed maximizes energy yield from the most prevalent winds, when power usually is most needed. It also protects the turbine from mechanical stress incurred by turbines that do not have said speed-limiting features, while still providing controlled electric power at levels the power loads can accept.

Generator power and efficiency with wind turbine drive is computed below, for a representative example of the present invention, at maximum shaft speed, mid-speed, and minimum usable speed, using a few simplifying approximations. Shaft speed, power, and the other variables in the computations herebelow are exemplary, and not intended as limiting the present invention in any way. This will help explain FIG. 1 and FIG. 2 configuration operation, distinctions and improvements over the prior art:

Let maximum speed equal 1000 revolutions per minute (rpm), mid-speed equal 500 rpm, and minimum speed equal 100 rpm. Also, let maximum stator current $I_{max}$=10 amperes, and nominal $V_{DC}$=100 volts. Further, let Q1-Q4 power MOSFET ON resistance $R_{dson}$=0.01 ohm, inductor L1-L2 winding resistance $R_L$=0.1 ohm. Also, stator winding resistance $R_s$=0.15 ohm, stator voltage $V_{max}$=100 volts at 1000 rpm, and fly-back (free-wheeling) diode D1-D8 forward drop $V_f$=1-volt at 10 amp. These parameters are consistent with a test prototype, according to the present invention, developed to generate power from wind turbines.

At 1000 rpm, $V_{max}$=100 volts, so PWM duty-cycle $(T_{on})/(T_{on}+T_{off})$ is essentially zero. Therefore, losses=$I_{max}^2(R_L+R_s)+2V_f I_{max}$=(10 amp)$^2$(0.25 ohm)+(2 volt)(10 amp), amounting to 45 watts loss. Output power=$(I_{max})*(V_{max})$=$(I_{max})*(V_{DC})$=(10 amp)(100 volts)=1000 watts. So, generator efficiency at maximum speed and maximum power is about 95% for this example of generator and integrated electronics parameters.

At 500 rpm, $I_{max}$=(10 amp)/(4)=2.5 amps; and $V_{max}$=(100 volts)*(0.5)=50 volts. So PWM duty-cycle=½. Average pulse power generated=$(I_{max})*(V_{max})$=$(I_{max})*(V_{DC})/2$=(2.5 amp)(50 volt)=125 watts. Losses to maintain inductor current=$I_{max}^2(R_L+R_s+R_{on})$=(2.5 amp)$^2$(0.26 ohm)=1.6 watts. Fly-back diode losses=$2V_f*I_{max}/2$=(0.6 v)(2.5 amp)=1.5 watts. So total losses=3.1 watts. Therefore, mid-speed generator efficiency is about 97%.

At 100 rpm, $I_{max}$=(10 amp)/(100)=0.1 amp; and $V_{max}$=(100 volts)/(10)=10-volts. So PWM duty-cycle=9/10. Average pulse power generated=$(I_{max})*(V_{max})$=$(I_{max})*(V_{DC})/10$=(0.1 amp)(10 v)=1 watt. Losses to maintain stator and inductor current=$I_{max}^2(R_L+R_s+2*R_{dson})$=(0.1 amp)$^2$(0.27 ohm)=0.0027-watt. Fly-back diode losses=$(2*V_f)*(I_{max})/10$=(0.6 v)(0.1 a)/5=0.012 watts. So total losses=0.015-watt. Thus, generator efficiency at low speed is about 98%.

Note that, although the generator according to the present invention is self-starting (meaning that it need not be connected to a power source, to begin power generation), the minimum speed of the above power and efficiency computation must be reached, before the signal processing electronics will function as required. Also, MOSFET gate driver under-voltage lockout may prevent PWM drive to Q1-Q4 in FIG. 1 until the minimum voltage is reached. Moreover, almost all the nominal minimum 1-watt generated power will be used to supply Power Control Electronics 5.

At the lowest usable shaft speed of 100 rpm in the above representative example, the 10-volt peak stator voltage generated would be adequate for all signal processing and PWM drive electronics, so this generator would be self-starting when turbine speed reaches 100 rpm. However, with 1-watt quiescent power for the Power Control Electronics, power supplied to the load at 100 rpm would be zero until wind speed increases a small amount, which for example can drive the turbine at approximately 125 rpm, where output power would be about 2-watts.

Figure 2A:
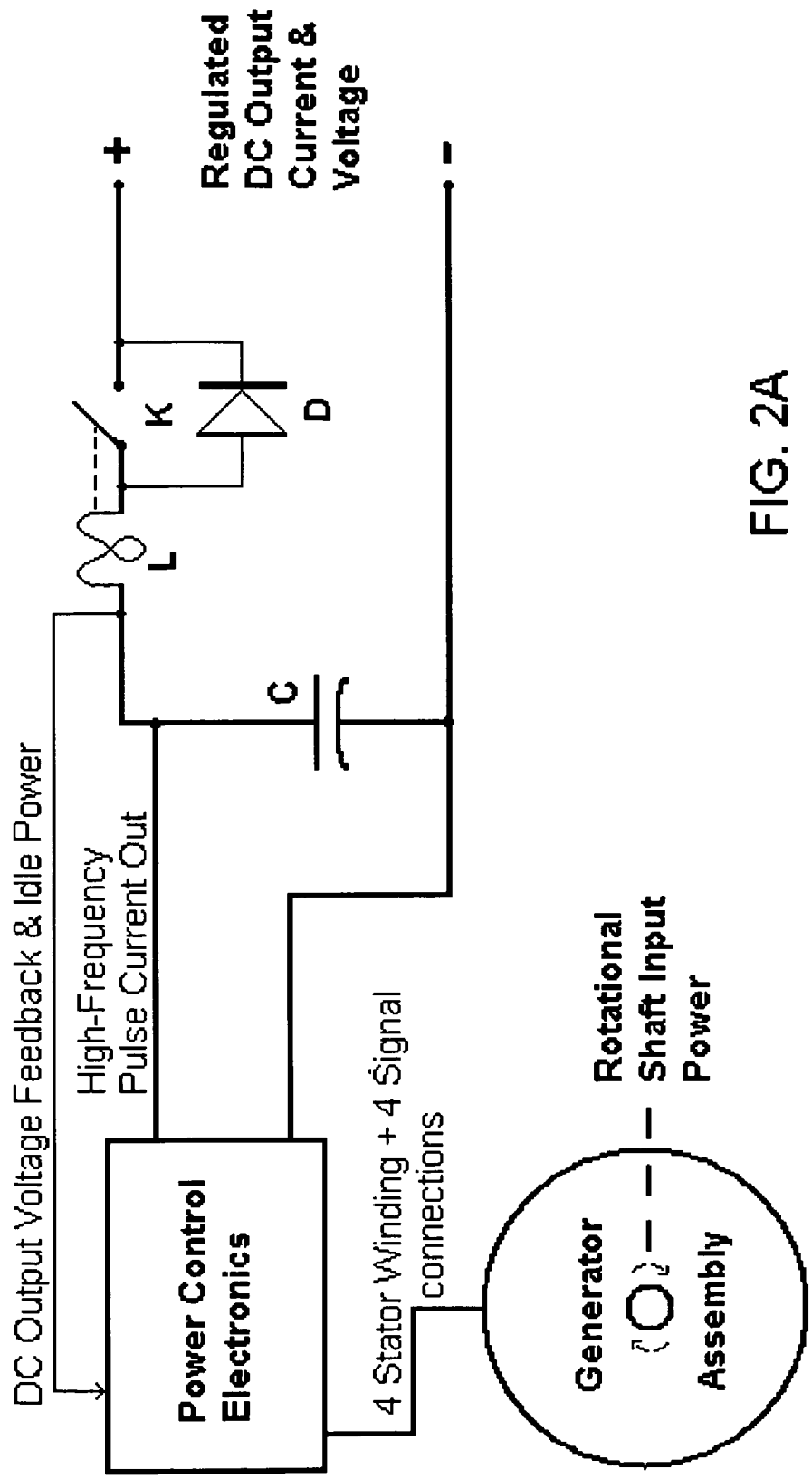
FIG. 2A illustrates an alternate embodiment for a self-starting generator system that never draws power from its load. Other embodiments may draw up to a few watts for signal processing quiescent power and status display, when wind power is below this amount.

As illustrated in FIG. 4, maximum 1000-watts power from a wind turbine that is the optimum power range for the generator of the above example, is normally considerably less frequent than intermediate power output. In circumstances where wind power is below this minimum that produces 100-rpm turbine speeds for extended periods, it may be desirable to prevent the Power Control Electronics from drawing quiescent power from a load. Circuit means is shown in FIG. 2A for essentially disconnecting the Power Control Electronics until it supplies at least a small current to the load. The power disconnect is by means of relay contact K opening when the current through relay control winding L is below its toggle threshold. The inductance of relay winding L is also useful for filtering PWM pulse currents cooperative with high-frequency capacitance C and with load capacitance. Relay winding L needs to have very low resistance, very high sensitivity that will open the relay contact with only 0.01-amp input and be capable of accommodating a maximum 10-amp current, or diode D alone may be a preferable choice to prevent the load from supplying the electronics quiescent current.

For the high power (1000 watts generator output) example, if the relay winding resistance is 0.1-ohm, it would dissipate 10-watts at 10-amps to the 100-vdc load. That would decrease the generator power efficiency at 1000 watts from about 95% to about 94%. Also for example, if diode D forward drop is 1-volt at 10-amps, including only diode D would likewise dissipate approximately 10-watts. Although these losses are higher at 1000-watt maximum power, at low power levels the alternate embodiment that includes the relay would have lower losses than an embodiment that includes the diode alone.

For a lower power example, at 100-vdc, 1-amp and 100-watt output, the relay loss from 0.1-ohm winding resistance and negligible contact resistance at 1-amp is 0.1-watt; whereas the diode loss with approximately 0.6-volt forward drop at 1-amp is 0.6-watt. A 0.1-watt loss from 100-watts output would result in only 0.1% lower efficiency with the relay in series with the generator load. When PWM current pulse filtering benefits are considered, an appropriate relay that has lower losses when generator output power is low and therefore usually most needed, and can also serve as a filter inductor, is a preferred option.

When a relay as shown in FIG. 2A is not included with the generator system, an inductor in series with the load is a preferred additional component that is not illustrated herein, to reduce high-frequency current ripple to the load due to pulse-width-modulation and also to minimize electro-magnetic-interference (EMI) that could interfere with international communications standards. Further, a Faraday shield is preferred for surrounding and inclosing the Power Control Electronics, constructed from high electrical conductivity material such as aluminum. And yet further, all conductors that connect between the Power Control Electronics and external components such as the generator assembly and the load, will preferably be connected through EMI suppressors. These devices provide a small series inductance that is lossy at very high frequencies. They are familiar to electronic engineers and to those versed in the art.

Figure 12:
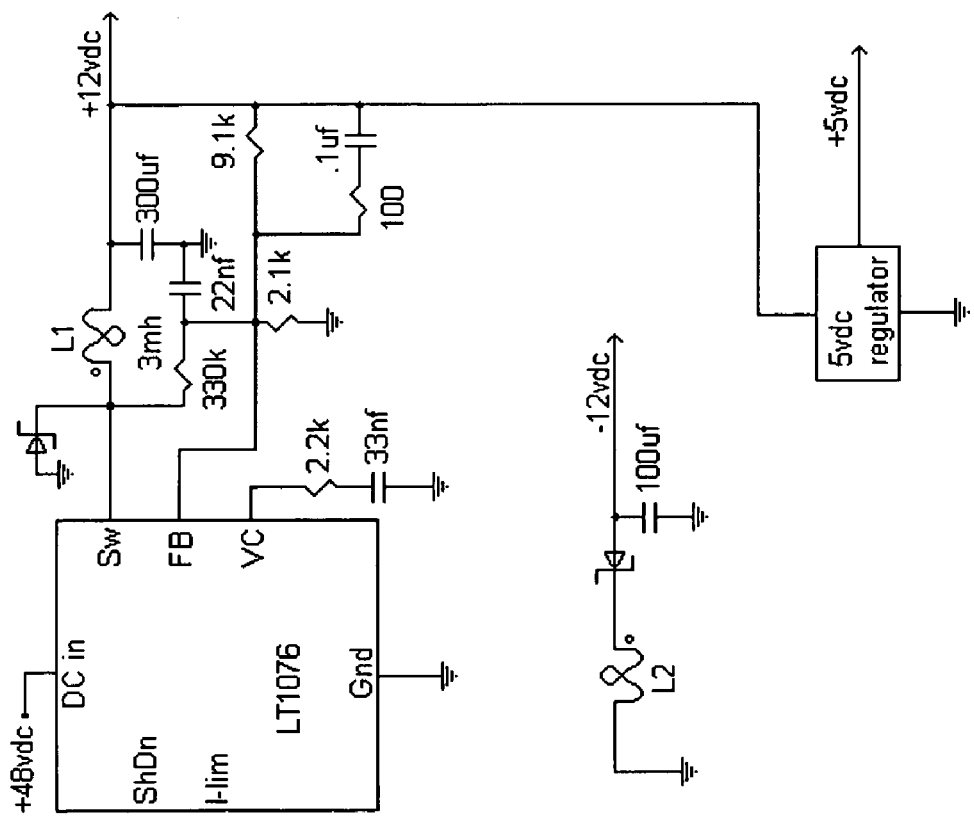
FIG. 12 shows a circuit for providing regulated and closely tracking +12 vdc, −12 vdc, and +5 vdc supplies, for the generator rotor angle sensors and the signal processing circuits.

Note that, for uses requiring higher DC Power Bus voltages, power MOSFET drain-source ON resistance $R_{dson}$ usually increases considerably with voltage rating. Moreover, power MOSFET voltage ratings beyond 500 volts begin to limit available fast power switching MOSFET options. Also, at DC power voltages higher than 50 volts, a substitute for the LT1076 regulator IC (Integrated Circuit) shown in FIG. 12, having a higher input voltage rating, will be needed. Topswitch PWM buck regulator ICs, by Power Integrations Inc., are likely options, for both signal processing electronics and DC power current and voltage control. At DC power voltages higher than 500 volts, IGBTs (Insulated Gate Bipolar Transistors) would become a likely option, over MOSFETs (Metal Oxide Silicon Field Effect Transistors).

Note also that, when no wind turbine shaft speed limiting is provided, by means briefly described hereabove, such that DC Power Bus voltage and current must be controlled by buck regulation, series (tandem) power losses are incurred in the buck regulators. With 95% efficiency buck regulation, combined with higher $R_{dson}$ power MOSFETs Q1-Q4, overall generator power conversion efficiency would be reduced to typically 90% at maximum and mid-speed wind, and typically reduced to about 60% at one-tenth maximum speed. Although DC-to-AC power inverters are not called buck regulators by their suppliers, it should be noted that they control their output current, fed to AC power lines, by buck regulation.

The most advantageous applications, for the wind turbine generator shown in FIG. 1 and FIG. 2, would be as wind turbine DC generators for distributed on-site power systems, wherein the wind turbine maximum speed is limited. Said generators are also uniquely compatible with flywheel batteries described in my U.S. Pat. Nos. 6,566,775 and 6,794,777. Said generator output current is DC and does not include significant current ripple components. Said flywheel batteries require DC input current and DC current loads, with essentially zero ripple components.

FIG. 4 illustrates available power (KW) from typical wind turbines, as a function of wind speeds from zero to 50 miles/hour (mph). Since turbine rotational speed is typically proportional to wind speed, and turbine torque is typically proportional to wind speed squared, available power from the turbine is typically proportional to wind speed cubed. FIG. 4 also shows, for a location with 10-mph average wind speed, the probable mean hours duration at each wind speed, known as a Rayleigh Statistical Wind Speed Distribution.

From the probable mean hours duration curve illustrated, note that the most probable wind speed (the prevailing wind speed present for the longest duration) is about 8-mph for a 10-mph average wind speed location, as shown. With turbine shaft torque proportional to the second power of wind speed, torque at 8-mph is about $(8/25)^2=10\%$ of available torque at 25-mph. With shaft power proportional to the third power of wind speed, power available at 8-mph is $(8/25)^3=$less than 4% of available power at 25-mph. A shaft torque of only 10% that at 25-mph (and less than 3% that at 50-mph) will usually not be enough to overcome speed-up gear friction and cogging torque, of prior art wind turbine generators. Moreover, prior art synchronous generators do not produce sufficient output voltage to feed typical loads, at wind speeds below about ⅓ maximum generating speed (over 16 mph for the example illustrated by FIG. 4).

Moreover, induction machines would draw power—not supply power—if connected at low wind speeds, and consequently, low shaft speeds. Besides that drawback, induction generators do not supply regulated power. Their power fluctuates with wind speed. Moreover, heating and need for cooling increases as induction generator efficiency falls drastically at speeds only several percent above their maximum power speed. Conversely, the present invention can efficiently generate high-quality power, at wind speeds here shown in a 5 to 50 mph range, which can yield very substantial energy, particularly at low wind speeds, over prior art generators.

By multiplying KW at MPH by Mean Hours at MPH, we obtain the statistical distribution Mean KWH at MPH, which is illustrated in FIG. 4. Note that the Mean KWH at MPH curve is a maximum at about 16-mph. Moreover, note that the area under the curve Mean KWH at MPH, over the entire speed range (here 0 to 50 mph) is the statistically probable energy yield potentially available from typical wind turbines, over a usual 1-year time-period. Considering that prior art generators, installed in locations like this example, cannot generate useful power at wind speeds under 16-mph, the area under the curve and therefore the potential harvested energy, at all wind speeds below 16-mph, is relinquished by them. That amounts to about half the total probable yearly energy potential of wind turbines. Power is also lost in their speed-up gears and generators at all wind speeds, amounting to over 10% of the potential turbine power. Moreover, cooling needs of prior art generators add further power losses and costs.

Conversely, the present invention is intended to generate high quality power over the entire 5 to 50 mph wind speed range illustrated in FIG. 4, with total generator losses under 5% of the potential turbine power. That wide wind speed range and high efficiency can produce more than double the energy yield of prior art generators, from the same wind turbines. Power from the present generator invention is also higher quality, because it has ripple-free regulated DC current, has regulated voltage, is compatible with flywheel batteries that connect to a DC power bus, compatible with photovoltaic solar panel installations, compatible with chemical battery charging, and compatible with poly-phase DC-to-AC inverters to augment utility grid power.

Most importantly, for applications to augment grid power, the present invention produces power that need never be disconnected (unlike the intermittent wind-farm power, turned ON and OFF as wind speed fluctuates, by the switch-gear of prior art generators). Such unregulated power peaks and disruptions, by prior art generators, have serious negative consequences; so most electric power utilities are reluctant to connect their grids to prior art generators.

Moreover, the present invention generator produces power at times when it is most useful, and does not incur nearly as much transmission line losses, because it can provide steady power at lower wind speeds, and regulated power at higher wind speeds, compared to the high and usually unregulated intermittent power of prior art generators.

Figure 5A:
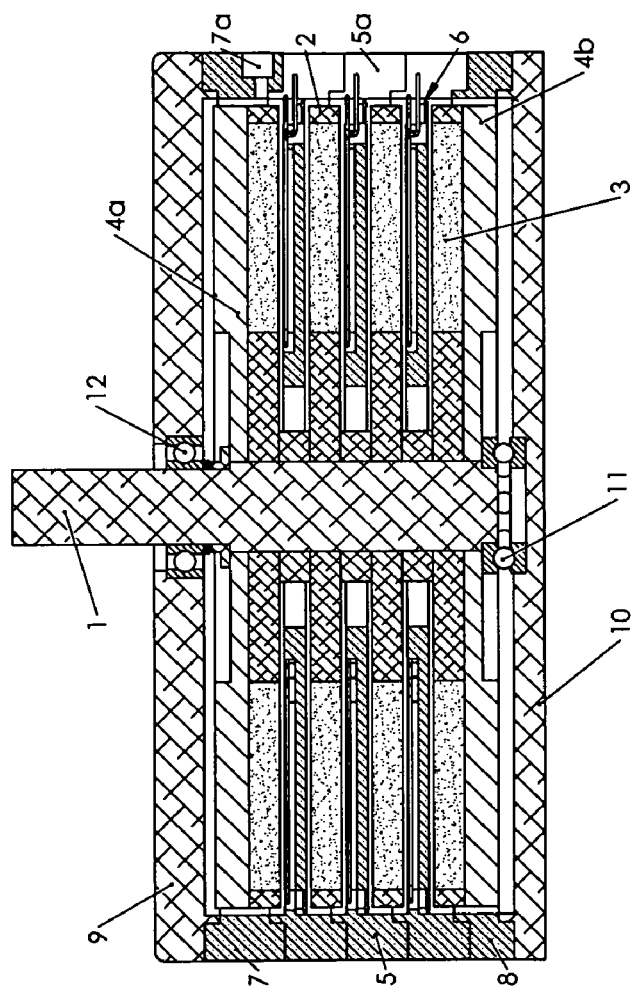
FIG. 5A illustrates a detailed cross-sectional view of a vertical spin axis present invention generator assembly, intended mainly for vertical-axis wind turbines.

The cross-section view in FIG. 5A shows main elements of a vertical axis generator, according to the present invention. Rotational input power is typically supplied to it by a vertical axis wind turbine, having a power output shaft coupled to the generator shaft 1, by means of a flexible coupling affixed to the respective shafts. A plurality of rotor magnet disks 2 closely fit around shaft 1, aligned therewith preferably by means of a key-way in shaft 1 and juxtaposed key-way grooves in each disk 2 inner diameter. Each rotor disk 2 supports a circular array of alternated pole axial-field magnets 3 attached therein. A return path, for the magnetic fields of magnets 3, in the disks 2 at each end, is preferably provided by high magnetic permeability iron disks 4a and 4b attached at each end of rotor disks 2. Rotor disks 2 are non-magnetic and have low magnetic permeability, to maximize flux density between the disks 2, which interacts with stator winding radial segments within stator disks 5. The stator disks 5 are preferably injection molded with the 2 stator windings they hold, and composed of a material that is electrically non-conductive, which has high thermal conductivity so that heat generated by current in the stator windings is conducted to the disk and generator outer surfaces.

Preferably, 2 phases are included in the present invention, because more phases would require more stator windings and more winding connections. One stator winding 6, of the two, is shown in cross-section FIG. 5A. The second stator winding axially abuts winding 6, and is disposed relative to winding 6 an angle [180 degrees divided by the number of poles].

Note that all rotor magnet disks 2 are identical parts. Note also that all stator disks 5 are identical parts, including axial channel 5a for connecting their respective stator windings. Stator ring 7 holds magnetic field sensors, shown by detail 7a, which provide substantially sinusoidal rotor angle signals from the revolving rotor magnets 3. Each sensor is aligned with a radial segment of a corresponding stator winding 6. Stator rings 7 and 8 facilitate accurate alignment of radially interlocking stator disks 5 and accurate axial clearances with rotor magnet disks 2.

Top enclosure disk 9 and bottom disk 10 are preferably a metal such as aluminum. Disk 10 supports preferably axial thrust ball bearing 11, which supports center shaft 1 axially and radially, at its lower end, while facilitating rotation about its center with minimal friction and drag torque. Top disk 9 supports preferably deep groove radial ball bearing 12, and facilitates a precise axial preload by accurate axial hold of its outer race, cooperative with a wave spring that exerts a prescribed upward thrust on its inner race.

Figure 5B:
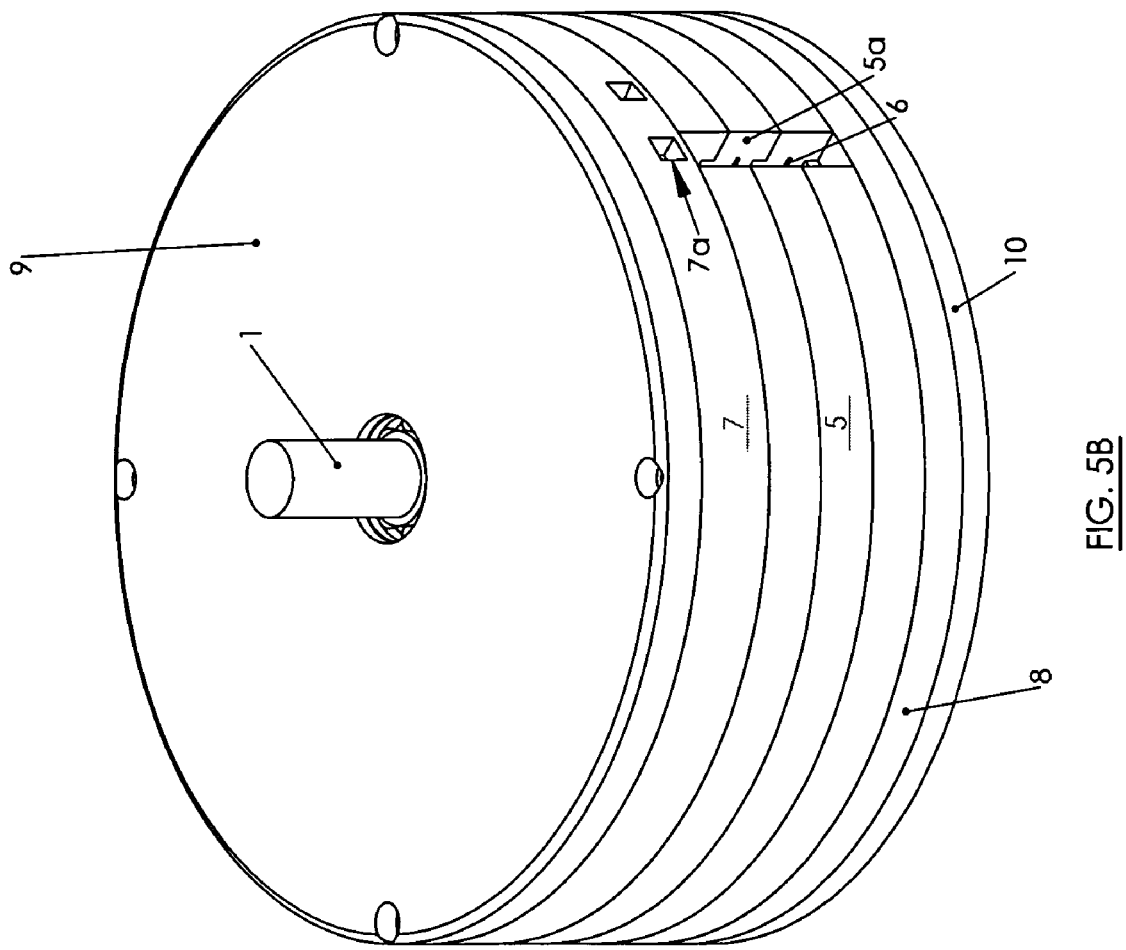
FIG. 5B shows an isometric projection view of the vertical spin axis generator assembly shown in FIG. 5A.

FIG. 5B illustrates an orthographic projection view of the vertical axis generator. It shows exterior views of shaft 1; stator disk 5 with winding connection channel 5a; stator ring 7 with sensor hold detail 7a; and stator ring 8. It also shows enclosure top disk 9; bottom support and enclosure disk 10; and four drilled, tapped, counter-sunk holes, from top disk 9 through bottom disk 10, to hold the assembly together and maintain rotational alignment of all stator disks and rotor angle sensors, with four fastener screws.

Figure 6A:
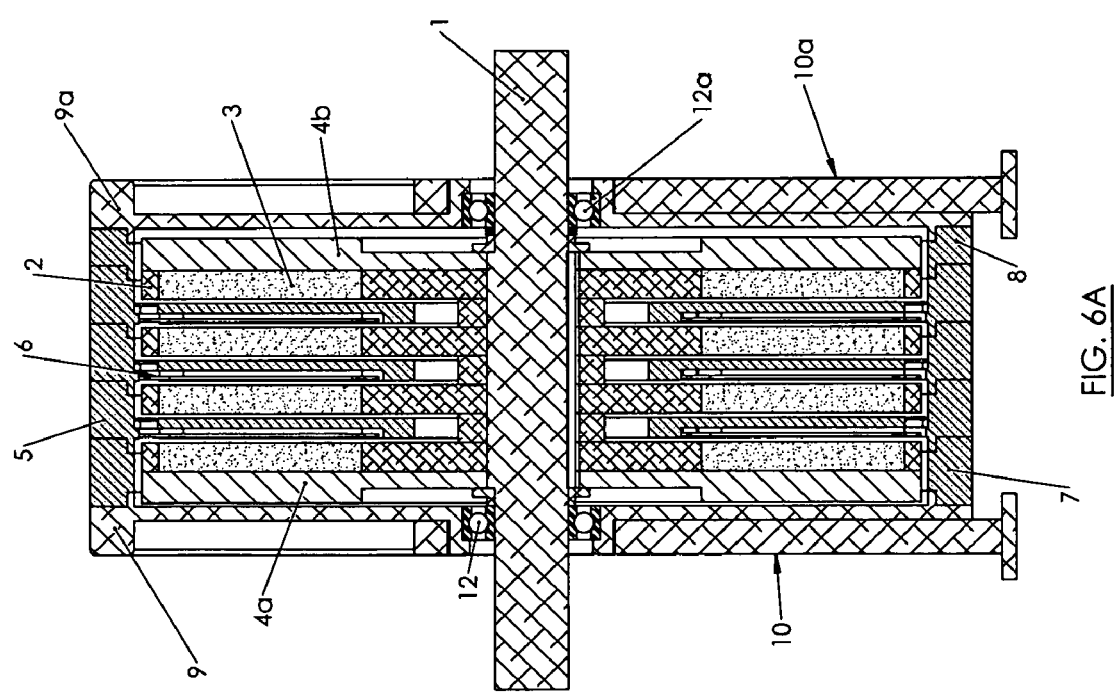
FIG. 6A illustrates a detailed cross-sectional view of a horizontal spin axis generator assembly, intended for horizontal-axis wind turbines and general applications.

The cross-section view in FIG. 6A shows main elements of a horizontal axis generator, according to the present invention. Rotational input power is typically supplied to it by a horizontal axis wind turbine, having a power output shaft coupled to the generator shaft 1, by means of a flexible coupling affixed to the respective shafts; or pedals may be attached at each end of shaft 1, for use in electric vehicles having an exercise option.

Like its vertical axis version, a plurality of rotor magnet disks 2 closely fit around shaft 1, aligned therewith preferably by means of a key-way in shaft 1 and juxtaposed key-way grooves in each disk 2 inner diameter. Each rotor disk 2 supports a circular array of alternated pole axial-field magnets 3 attached therein. A return path, for the magnetic fields of magnets 3, in the disks 2 at each end, is preferably provided by high magnetic permeability iron disks 4a and 4b attached at each end of rotor disks 2. Rotor disks 2 are non-magnetic and have low magnetic permeability, to maximize flux density between the disks 2, which interacts with stator winding radial segments within stator disks 5. The stator disks 5 are preferably injection molded with the two stator windings they hold, and composed of a material that is electrically non-conductive, which has high thermal conductivity so that heat generated by current in the stator windings is conducted to the disk and generator outer surfaces.

A lighter weight generator assembly embodiment that would cost more than the preferred embodiments is also contemplated. In that so called "ironless generator" embodiment, the iron disks 4a and 4b shown in FIG. 5A-5B would each be implemented by disk magnets that may have the same physical form as the iron disks. However, said disk magnets would need to be magnetized with axial poles aligned with the magnets affixed to the rotor disks, with a magnetic pattern between said axial poles that transitions between axial to tangential to axial, and so forth. Said magnetic pattern would provide a continuous flux path at each end of the rotor disks that substantially follows the same return flux path as the iron disks 4a and 4b. Because the two disk magnets are thereby disposed so they are not required to have high coercive force, they do not need to be rare earth magnets, which would be difficult to magnetize in said axial and tangential pattern. However, if thus magnetizing rare earth magnets such as Neodymium-Iron-Boron is cost-effective, another contemplated embodiment would include replacing adjoining rotor magnet disks 2 and iron disks 4a and 4b by said magnets.

Like the vertical axis version, preferably 2 phases are included in the horizontal axis version. One stator winding 6, of the two, is shown in cross-section FIG. 6A. The second stator winding axially abuts winding 6, and is disposed relative to winding 6 an angle of 180 degrees divided by the number of poles. Note that all rotor magnet disks 2 are identical parts. Note also that all stator disks 5 are identical parts, including axial channel 5*a* for connecting their respective stator windings. Stator ring 7 holds magnetic field sensors, shown by detail 7*a*, which provide substantially sinusoidal rotor angle signals from the revolving rotor magnets 3. Each sensor is aligned with a radial segment of a corresponding stator winding 6. Stator rings 7 and 8 facilitate accurate alignment of radially interlocking stator disks 5 and accurate axial clearances with rotor magnet disks 2. Substantially all the elements described hereabove, and illustrated in FIG. 5A and FIG. 6A, for respective vertical and horizontal axis generator versions, are identical.

Left enclosure disk 9 and right enclosure disk 9*a* are preferably a metal such as aluminum. Note that disks 9 and 9*a* are identical parts. Disk 9 holds the outer race of deep groove radial ball bearing 12. Right disk 9*a* holds the outer race of like ball bearing 12*a*. Their inner races support center shaft 1 axially and radially, while facilitating rotation about its center axis with minimal friction and drag torque. When assembled, a precise axial preload is facilitated, by accurate axial hold of the bearing outer races, cooperative with a wave spring that exerts a prescribed outward thrust on their inner races. This assembly is supported by brackets 10 and 10*a*.

Figure 6B:
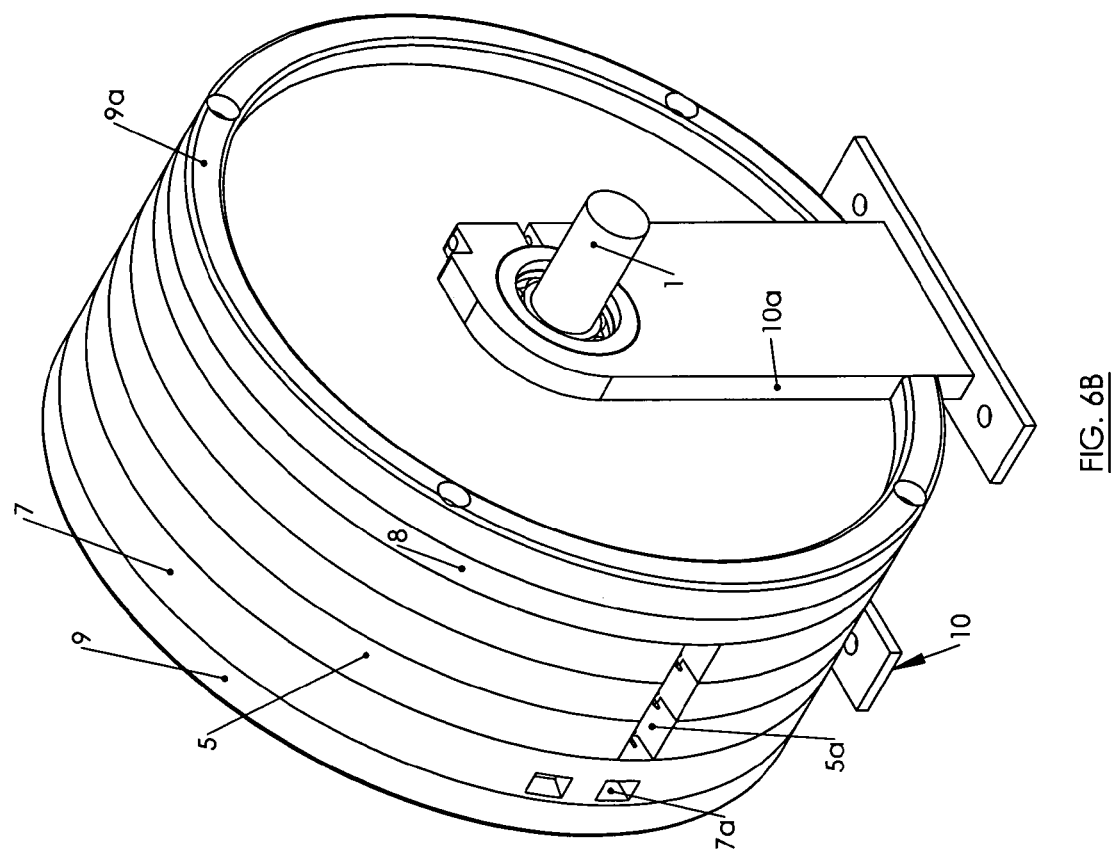
FIG. 6B shows an isometric projection view of the horizontal spin axis generator assembly shown in FIG. 6A.

FIG. 6B illustrates an orthographic projection view of the horizontal axis generator. It shows exterior views of shaft 1; stator disk 5 with winding connection channel 5*a*; stator ring 7 with sensor hold detail 7*a*; and stator ring 8. It also shows left disk 9; right disk 9*a*; and four drilled, tapped, countersunk holes, from disk 9*a* through disk 9, to hold the assembly together and maintain rotational alignment of all stator disks and rotor angle sensors, with four fastener screws. Bracket 10 and 10*a* fastening details, and base support attachment, are also shown here.

Figure 7A:
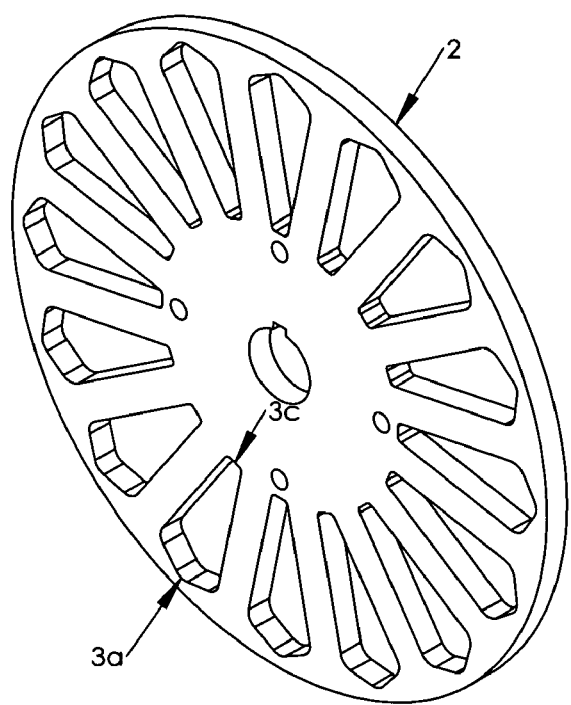
FIG. 7A-B illustrates two among many options of a rotor disk in the generator assembly, each having a circular array of receptacles to hold affixed therein an even number of alternated pole axial-field magnets.
Figure 7B:
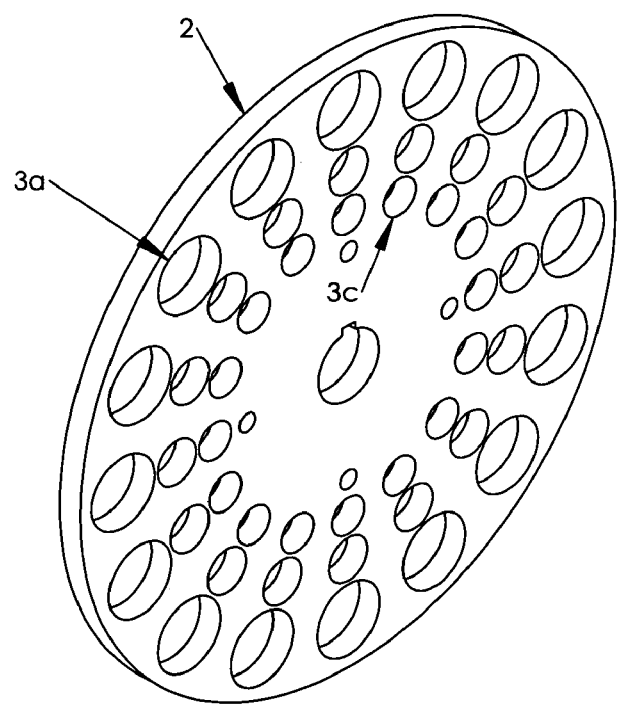

One of a plurality of rotor disks 2, to hold fastened therein 16 (for example) axially magnetized, preferably Neodymium-Iron-Boron magnets, samarium-cobalt or other similar magnet materials, in an alternated pole array, is illustrated by orthographic projection FIG. 7A. The nearest magnet proximity to the rotation axis is here denoted 3*c*; the furthest proximity to the rotation axis is denoted 3*a*. Alternate rotor disk embodiment FIG. 7B is an option wherein three (for example) lower cost magnets constitute each magnetic pole.

Figure 8A:
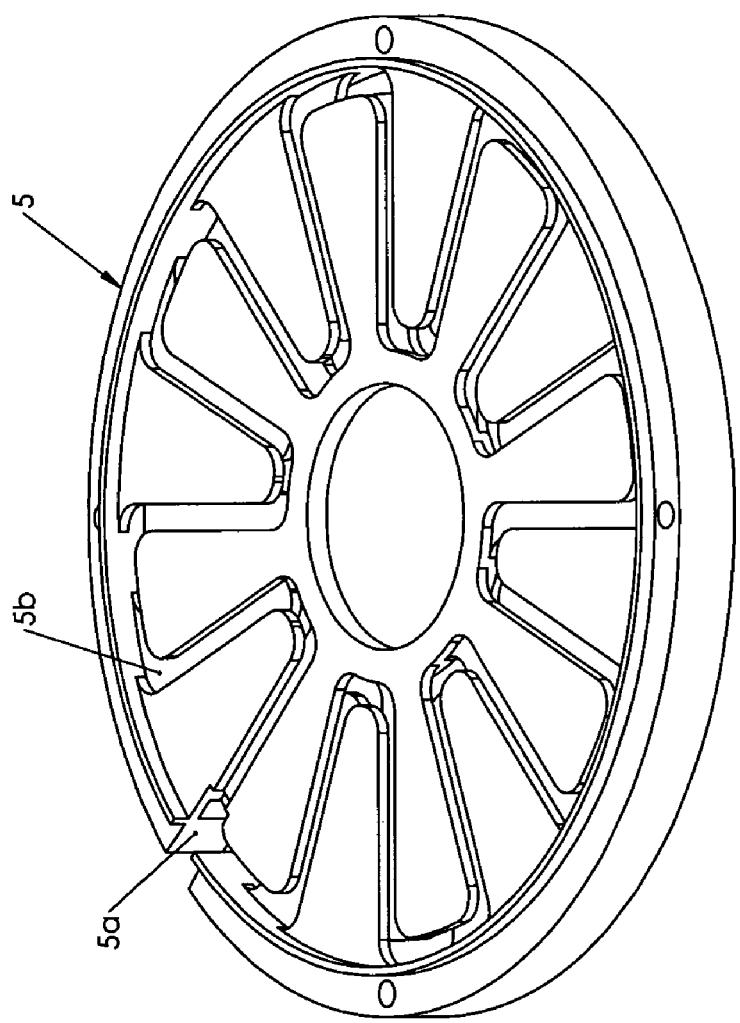
FIG. 8A illustrates the electrically non-conductive, thermally conductive, body of each stator disk, including space within it for holding and connecting to its two stator windings.

One of the cooperative stator disks 5 is illustrated by the orthographic projection FIG. 8A. Each stator disk holds two stator windings. A connection channel 5*a* is shown, for the winding terminals. Contiguous space 5*b* is shown for one of the two windings, and is partially visible for the second winding. Axial dimensions of stator disks 5, rings 7 and 8, plus other parts that determine axial positioning, must maintain adequate clearances between all rotor and stator parts.

Figure 8B:
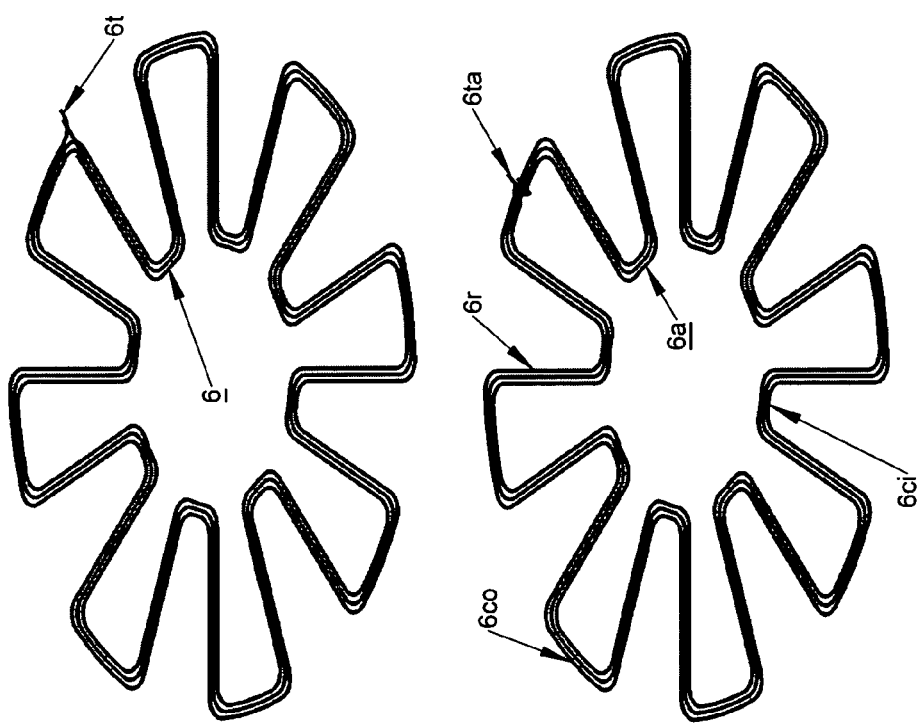
FIG. 8B illustrates the two stator windings, each preformed to fit axially abutted to each other, within the stator disk shown in FIG. 8A.

Two stator windings, 6 and 6*a*, each preferably formed from single-strand magnet wire with an insulating coating, having 3 series passes (also known as turns) in some generator embodiments according to the present invention, are shown in FIG. 8B. Stator winding radial segments 6*r* interact with the rotor magnetic field. Their current path is continued via outer arc segments 6*co* and inner arc segments 6*ci*, and via winding terminals 6*t* and 6*ta*. The 2 stator windings are abutted axially, and displaced 11.25 degrees, relative to each other, in the 16-pole stator disk shown in FIG. 8A. For a prototype generator, said stator disks are machined from bulk material that is electrically non-conductive; and pre-formed stator windings are bonded within the recessed space shown. For production design generators, according to the present invention, the pre-formed stator windings may be injection-molded within the space shown, with a thermally conductive resin available commercially from numerous suppliers.

With specialized wire-forming equipment, square cross-section wire would be preferable compared to round magnet wire, since a square cross-section facilitates more conductor area and therefore lower stator winding resistance, in an equivalent stator disk space. FIG. 8B illustrates two very similar stator wire form candidates. Clearly, the stator windings may have one or any appropriate number more "turns" and the wire form for each phase may be identical to one another to minimize the number of different parts needed for the generator assembly.

FIG. 9A is a schematic that will be understood by electronic engineers, of a new circuit for accurately converting, over a very broad dynamic range (i.e., the variable V ranging from less than 1 millivolt to 2 volts), a feedback signal V*sin(wt)+2.5 v from a commercially available current sensor, to the absolute value current feedback 5*V*/sin(wt)/. The absolute value is needed to control stator winding current by pulse-width-modulation, according to the present invention. Note the diodes inside the amplifier feedback loop, which allow only one polarity output and prevent over-driving amplifiers when negative feedback is blocked. FIG. 9B achieves a similar and generally more accurate result with fewer parts; but does not prevent over-driving the amplifier when its negative feedback is blocked by a diode in series with its output. So it requires amplifiers with a faster recovery after being over-driven, to accurately process signals at higher generator rotational speeds (where signal frequency is correspondingly higher). Since the signals they process are larger at higher rotational speeds, the circuit shown by FIG. 9B is preferable.

Figure 10A:
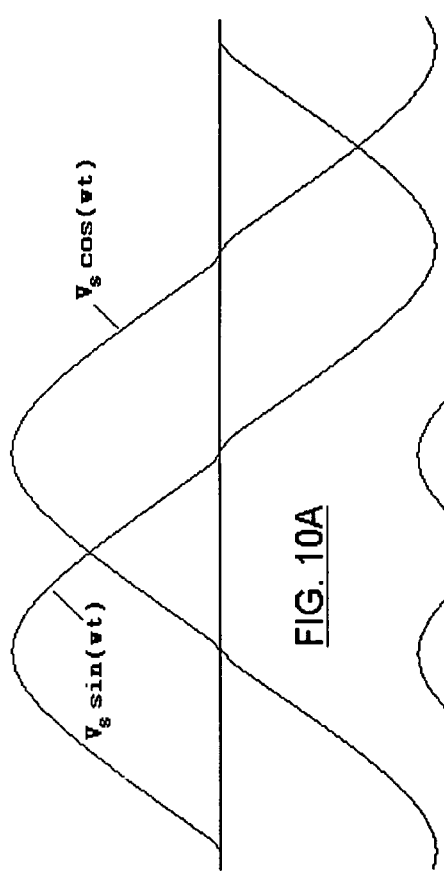
FIG. 10A-B-C shows nearly sinusoidal 2-phase stator voltages $V_s \sin(wt)$ and $V_s \cos(wt)$, with stator currents $I_s \sin(wt)$ and $I_s \cos(wt)$, in phase relation to filtered PWM pulse output currents $I_s \sin^2(wt)$ and $I_s \cos^2(wt)$, as functions of time.

FIG. 10A illustrates voltage generated across the respective 2-phase stator windings, approximating $V_s$*sin(wt) and $V_s$*cos(wt). Amplitude $V_s$ is proportional to speed and (wt) equals the product of said voltage frequency and time.

Figure 10B:
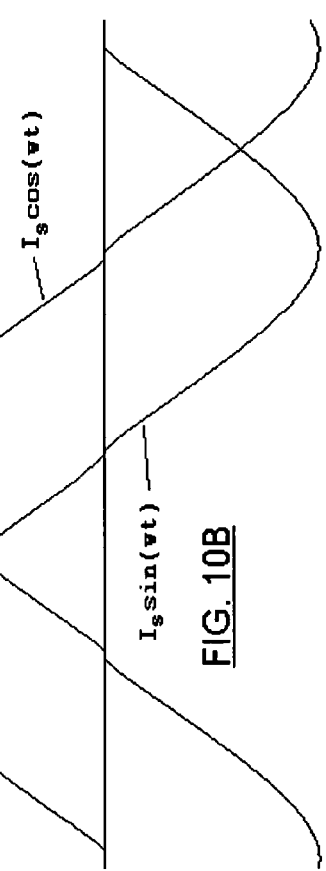

FIG. 10B illustrates current controlled by pulse-width-modulation, approximating $I_s$*sin(wt) and $I_s$*cos(wt) with a time base corresponding to FIG. 10A. For generator embodiments intended to generate maximum power from wind turbines, over a broad speed range, amplitude $I_s$ is proportional to speed squared. Said current is controlled by Power Electronics 5 shown in FIG. 1, by electronics therein that process respective maximum signals 2 v*sin(A) and 2 v*cos(A), denoted 3 and 4 in FIG. 1, which preferably are provided by Hall sensors at locations 7*a* in stator rings 7, shown in FIG. 5B and FIG. 6B.

Figure 10C:
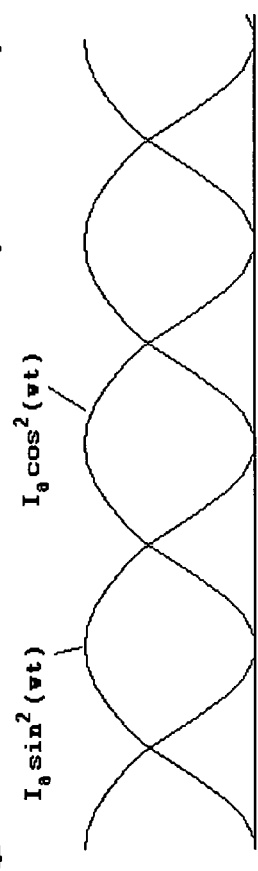

FIG. 10C illustrates resulting generator output current components after high-frequency pulse filtering $I_s$*sin$^2$(wt) and $I_s$*cos$^2$(wt), which is equal to $I_s$ having minimal ripple, with a time base corresponding to FIG. 10A, which combine to provide DC current $I_s$ fed to a DC voltage bus load. Said DC current can contain substantially zero ripple components, without need for large filter capacitors.

Stator voltage due to generator shaft rotation can be computed from:

$$V_s\text{(volts per radial segment)} = B_{max}\text{(weber/m}^2\text{)} * L\text{(m)} * v\text{(m/sec)}.$$

Generator load torque due to stator winding current can be computed from:

$$\text{Force(newton per radial segment)} = B_{max}\text{(weber/m}^2\text{)} * L\text{(m)} * I\text{(amperes)}.$$

For a prototype generator according to the present invention:

$B_{max}$=flux density at each radial segment when centered with a motor magnet $B_{max}$=6000 gauss=0.6 weber/meter L=length of each wire segment (meters) in field $B_{max}$ (see 3a and 3c in FIG. 7A-B)

L=magnet $R_o$-$R_i$=2.8 inch=0.07 meter ($R_o$=5.2 inch, $R_i$=2.4 inch)

v=average velocity relative to field (meter/sec) at 1000 rpm shaft speed

Therefore, at 1000 rpm:

$v=[2*pi]*[(R_o+R_i)/2]/rev*[1000$ rev/min$]*$(min/60 sec)=398 inch/sec=10 m/sec Thus, at 1000 rpm:

$E_{max}$(volt/segment)=0.6 weber/m$^2$*0.07 m*10 m/sec=0.42 volt

For 16-pole generator with 3 turns on each of 5 stator disks:

Total $E_{max}$ at 1000 rpm=16*3*5*0.42 volt=100 volts.

Generated electric power=$E_{max}*I_{max}$=(100 volts)*(10 amp)=1-kilowatt.

For this example, the total for 5 stator disk windings connected in series, each #12AWG (which has 0.08 inch diameter, 1.6 ohm/1000 ft.), magnet wire length approximates 1000 inches (about 80 feet). So total stator winding resistance, of 5 windings connected in series, is about 0.15 ohm. Then, at 10-amp maximum current per phase, copper loss per phase approximates (10 amp)$^2$/(2)*(0.15 ohm) which is approximately 7.5 watts. Therefore, total copper loss in the five stator disks of this example approximates 15 watts at 10 amperes DC current output. This loss amounts to 1.5% of shaft (mechanical input) power.

This stator voltage, power, and loss computation is important for optimally matching the generator to its intended DC power bus load voltage, calculating generated power, and for estimating power conversion efficiency and stator winding heat dissipation at various loads. Torque load of this 16-pole, 5 stator disks, 3 turns/disk generator, at 10 amperes DC load= (total forces on its stator winding radial segments)*(radius from rotational axis). Therefore:

Torque(ntn meter)=0.6 weber/m$^2$*0.07 m*10 amp*0.096 m*16*3*5=9.6 ntn·m.

Mechanical Shaft Power=Torque*Speed=(9.6 ntn*m) *(1000 rev/min)*(6.28/rev)*(min/60 sec)*(1 watt)/(ntn*meter/sec)=1-kilowatt.

This torque and mechanical power computation is important for optimally matching the generator to its intended wind turbine or various other drivers, and for certification testing power conversion efficiency over the intended operating speed and torque range. The above simplified electrical and mechanical power computations do not include any loss factors. So they are equal here.

This is the maximum torque, caused by circumferential forces distributed evenly over each radial stator winding segment of one stator phase, in the rotor magnet axial field. The torque produced by the second stator phase is zero, when maximum at the other phase, because flux density at the second stator phase is then zero, and current through the second phase is also then zero. As the rotor spins, the sum of torques from the 2 phases, is constant. So there is no torque ripple, and no cogging torque (mainly because the stator disks have no iron core).

It should be noted from the above detailed generator geometry and computations, that relatively large generator diameters are needed, compared to prior art generators driven by low-speed wind turbines, to obviate need for speed-increase gearing. Therefore, present invention generator embodiments intended for horizontal-axis wind turbines will preferably include an aerodynamic nacelle (a substantially cone shape that minimally impedes air flow) at each end of the generator. Such nacelles can additionally provide secure housing for the generator integral electronics, protected from weather damage such as from rain, dust, and the like. They can also provide additional shielding to prevent weather damage, for the ball bearings at each end of the generator assembly. Note that the design of this generator mechanical assembly can be sealed, because it does not rely on interior air flow for cooling, as do many prior art generators.

Note also the importance of obviating the prior art generator need for speed-up gearing, and the zero cogging torque of the present invention generator: At low wind speeds, either said prior art generator cogging torque, or speed-up gearing stiction and friction, usually causes wind turbines to stall at low wind speeds, because torque available at low wind speed is very low.

Lubrication needs for gears are usually higher and involve far more periodic maintenance, than lubrication needed by rolling element bearings. So maintenance costs are correspondingly higher, for prior art generators, than will be needed by generators according to the present invention.

As noted by detailed descriptions herein, of means to control generator output voltage and current by series buck-regulator circuits, losses incurred thereby cause lower generator efficiency, particularly at low wind speeds. Therefore, it would be very advantageous if turbine shaft speed can be limited. Variable blade pitch is preferable. Wind diverters are good options. Sliding brake surface means, whereby braking action that limits speed is controlled by a centrifugal governor, is also an option. A shaft disconnect clutch is yet another option; however no power can be generated unless the turbine and generator are connected.

Power available from hydrodynamic sources such as flowing water is, like wind power, proportional to the third power of speed. So the same electronics signal processing of the primary embodiment of the present invention is also applicable to generators intended to maximize electric energy yields from variable-velocity water driven turbines.

Summarizing the hereinabove detailed description and its associated illustrations, a new wide-speed-range generator, and its various new subsystems, new element combinations, and new electronics, provided by the present invention, include:

(1) Rotor magnets held in rotor disks, to provide an alternating nearly sinusoidal field pattern to each phase of stator windings held in coreless stator disks between the magnets, with relative velocity as the rotor spins producing stator voltage, without magnetically cycling iron or magnets in their closed magnetic flux paths. Stator winding current, controlled by integral electronics PWM boost regulation, to provide usable regulated DC output power having minimal ripple current, from the generator input mechanical shaft power, to produce maximum energy yield over a broad speed range.

(2) Rotor magnet sensors, responsive to rotor angle, each aligned with a respective stator winding phase, to each provide a nearly sinusoidal feedback signal responsive to rotor angle, processed by the integral electronics to control respective stator conductor current.

(3) Current sensors, to each provide a current feedback signal, corresponding to respective stator conductor current, for negative feedback loops that control the PWM circuits.

(4) Signal processing electronics, responsive to the rotor magnet sensors and stator current sensors, and to DC voltage feedback, to control stator current by PWM and thereby efficiently generate regulated DC current and voltage, from wide-speed-range rotational power, by boost regulation. PWM fly-back current pulses are filtered, so the resulting poly-phase currents combine to minimize ripple components without large capacitors.

(5) Scalable combinations of the number of rotor and stator disks, and associated electronics, which facilitate a wide power range, without need for many different size parts and the tooling required to manufacture them.

(6) Preferably iron disks to provide return flux paths for the rotor magnets in the adjoining rotor disks. A lighter weight generator assembly may substitute permanent-magnet disks in place of the iron disks (and possibly also the two adjoining rotor disks) that would substantially provide equivalent return flux paths.

(7) Various components in series with the generator load, such as an inductor to minimize high-frequency pulse current, a relay mainly to prevent drawing generator electronics quiescent power from the load, and various EMI shielding means.

While the foregoing detailed description of the present invention describes preferred embodiments, no material limitations to the scope of the claimed invention are intended. It will be understood that the present invention may have many variations in addition to those described by example herein, with appropriate embodiments using constituent elements to best suit a particular situation, application, or requirement. Further, features and design alternatives that would be obvious to one of ordinary skill in the art are considered to be incorporated herein. Accordingly, it is intended that the claims as set forth hereinafter cover all such applications, embodiments, and variations thereto within the true spirit and scope of this invention.

I claim as new and an improvement to the prior art, and desire to secure by Letters Patent:

1. A generator, including a coreless stator and rotor assembly, and integral power control electronics, for producing regulated DC current and voltage, from mechanical shaft input power, over a broad range of shaft speeds, comprising:

stator disks holding 2-phase stator windings in a non-conductive non-magnetic matrix, axially juxtaposed with abutting conductor insulation, said windings angularly juxtaposed relative to each other 180° divided by the number of poles, said disks angularly aligned with a selectable number of like disks, that each produce across their windings a substantially sinusoidal voltage having amplitude and frequency proportional to shaft speed;

rotor disks holding a plurality of axially-magnetized alternating pole permanent-magnets, attached therein in a symmetrical circular array around and attached to a rotatable center shaft, said rotor disks angularly aligned with a selectable number of like disks numbering one more than the number of stator disks, the axial magnetic field from the rotor disks at the stator varying substantially sinusoidally with rotor angle;

two rotor angle sensors, responsive to the magnetic field from the rotor disks, the two sensors respectively aligned with the center of a stator winding radial segment of corresponding phase, to sense the rotor magnetic field and produce constant peak amplitude substantially sinusoidal signals varying with rotor angle; and integral power control electronics, responsive to the signals from the rotor angle sensors, and to a DC output voltage feedback signal, and to user settings, and to stator winding current feedback signals processed by circuits having wide dynamic range, for controlling current through the stator windings by high-frequency pulse-width-modulation, to provide DC power by filtered high-frequency PWM boost-regulation fly-back, having regulated current and voltage, for a DC load, from shaft power, over a broad range of shaft speeds.

2. The generator of claim 1, wherein said integral power electronics in a generator embodiment intended to produce regulated DC current and voltage from wind turbines, with output power proportional to the third power of speed, over a broad speed range, further comprises:

means to compare a reference command signal with DC voltage feedback, and to provide a corrective signal therefrom;

means to provide from sinusoidal and cosinusoidal rotor angle sensor signals, a signal proportional to rotor speed squared;

means to process the rotor angle sensor signals to provide their absolute values, and to multiply the respective absolute values by the speed-squared signal, for providing respective stator current command signals;

means to sense and process over a wide dynamic range, respective stator winding currents, to obtain respective stator winding current absolute values;

means to compare the respective stator current command signals, with the stator winding current signals, to provide respective PWM stator current control; and over-voltage protection means, to inhibit PWM stator current output if DC output voltage exceeds a prescribed level.

3. The generator of claim 1, wherein said integral power control electronics in a generator embodiment intended to generate electric power from varied mechanical shaft power sources further comprises:

means to compare a reference command signal with DC voltage feedback, and to provide a corrective signal therefrom;

means to compare said corrective signal with an effort level selection, to provide an effort level signal that optimizes mechanical shaft load;

means to process the rotor angle sensor signals, to provide their respective absolute values, and to multiply the respective absolute values by the effort level signal, for providing respective stator current command signals;

means to sense and process over a wide dynamic range, respective stator winding currents, to obtain respective stator winding current absolute values;

means to compare the respective stator current command signals, with the current absolute values, to provide respective PWM stator current control; and over-voltage protection means, to inhibit PWM stator current output if DC output voltage exceeds a prescribed level.

4. The generator of claim 1, wherein said coreless stator and rotor generator assembly further comprises a vertical rotation axis and relatively large diameter, containing a plurality of rotor disks holding a relatively high number of poles intended to obviate speed-up gearing, to generate regulated DC current and voltage, over a wide speed range partly enabled by its zero cogging torque and absence of gear friction, from vertical-axis wind turbine shaft power.

5. The generator of claim 1, wherein said coreless stator and rotor generator assembly further comprises a horizontal rotation axis, to generate regulated DC current and voltage over a wide speed range partly enabled by its zero cogging torque and absence of gear friction, from horizontal-axis wind turbine shaft power.

6. The generator of claim 1, wherein said rotor disks further comprise axially magnetized permanent-magnets having contours to provide nearly sinusoidal flux variation with rotor angle, for the stator winding radial segments and for the rotor angle sensors.

7. The generator of claim 1, wherein said coreless stator and rotor generator assembly further comprises stator disks having an electrically non-conducting matrix that is thermally conductive, to transfer heat from stator winding copper loss to the generator assembly outer diameter.

8. The generator of claim 1, including the electronics of claim 2, further comprising sliding brake surface means to limit shaft speed when otherwise not limited by a wind turbine coupled to its shaft, to provide continued regulated output power from the generator, during high winds that would otherwise result in shaft speeds beyond the generator regulated voltage range, without series buck regulators that compromise low speed range efficiency.

9. The generator of claim 1, further comprising at least one buck regulator in series with its output, to provide various regulated output voltages.

10. The generator of claim 1, further comprising a 3-phase inverter in series with its output, to provide regulated 3-phase power with minimal distortion and selectable phase.

11. The generator of claim 1, further comprising signal processing circuits to control pulse-width-modulation with high precision over a very broad dynamic range.

12. The generator of claim 1, in further combination with a wind turbine having a shaft coupled to drive said generator, wherein a selectable number of rotor and stator disks is matched with said wind turbine, to optimize the wind turbine load for producing maximum generated electric power over a very broad wind speed range.

13. The generator of claim 1, in further combination with a water turbine coupled to drive said generator, wherein said selectable number of rotor and stator disks is matched with said water turbine, to optimize the water turbine load for maximum generated power.

14. The generator of claim 1, in further combination with pedals to drive its shaft, installed in an electric vehicle, to provide a battery charger and recumbent cycling exercise option in the vehicle, that also extends the vehicle driving range.

15. The generator of claim 1, further comprising an iron disk at one end of the rotor disks and another iron disk at the opposite end, to provide return flux paths for the axial-field rotor magnets therebetween.

16. The generator of claim 1, further comprising a multi-pole magnetized disk at one end of the rotor disks and another multi-pole magnetized disk at the opposite end, to provide continuous axial and tangential flux path rotor magnets at each end, for an ironless generator embodiment.

17. The generator of claim 1, further comprising means to prevent drawing even relatively low quiescent generator power compared to electric power normally delivered to a load connected thereto, said quiescent generator power normally needed for signal processing electronics and status monitoring, by blocking reverse current from the load with a relay and a diode whenever the generator output power is less than said quiescent power.

18. The generator of claim 1, further comprising means to prevent drawing even relatively low quiescent generator power compared to electric power delivered to a load connected thereto, said quiescent generator power normally needed for signal processing electronics and status monitoring, by blocking reverse current from the load by including a diode in series with the load.

* * * * *